US008341935B2

(12) United States Patent
Marques et al.

(10) Patent No.: US 8,341,935 B2
(45) Date of Patent: Jan. 1, 2013

(54) INTERNAL MIXING OF A PORTION OF FAN EXHAUST FLOW AND FULL CORE EXHAUST FLOW IN AIRCRAFT TURBOFAN ENGINES

(75) Inventors: Edward C. Marques, Issaquah, WA (US); Matthew D. Moore, Everett, WA (US)

(73) Assignee: The Boeing Company, Chicago, IL (US)

( * ) Notice: Subject to any disclaimer, the term of this patent is extended or adjusted under 35 U.S.C. 154(b) by 296 days.

(21) Appl. No.: 12/779,517

(22) Filed: May 13, 2010

(65) Prior Publication Data

US 2011/0167786 A1 Jul. 14, 2011

Related U.S. Application Data

(63) Continuation-in-part of application No. 11/758,406, filed on Jun. 5, 2007, now Pat. No. 7,762,057.

(51) Int. Cl.
*F02K 3/04* (2006.01)
(52) U.S. Cl. .............................. 60/264; 60/226.1; 60/230
(58) Field of Classification Search ........ 60/226.1–226.3, 60/262, 230, 39.5; 239/265.25, 265.27; 181/213, 181/215, 220
See application file for complete search history.

(56) References Cited

U.S. PATENT DOCUMENTS

| 3,579,993 | A |   | 5/1971 | Tanner |  |
|---|---|---|---|---|---|
| 3,601,340 | A |   | 8/1971 | Hilbig |  |
| 3,726,091 | A |   | 4/1973 | Tontini |  |
| 3,814,323 | A |   | 6/1974 | Leynaert et al. |  |
| 3,910,375 | A | * | 10/1975 | Hache et al. | 181/215 |
| 4,372,110 | A |   | 2/1983 | Cheng et al. |  |
| 5,440,875 | A |   | 8/1995 | Torkelson et al. |  |
| 5,758,488 | A |   | 6/1998 | Batey |  |
| 5,761,900 | A |   | 6/1998 | Presz, Jr. |  |
| 5,775,095 | A |   | 7/1998 | Zysman et al. |  |
| 5,884,843 | A |   | 3/1999 | Lidstone et al. |  |
| 6,070,407 | A | * | 6/2000 | Newton | 60/226.1 |
| 6,311,928 | B1 |   | 11/2001 | Presz, Jr. et al. |  |
| 6,786,038 | B2 |   | 9/2004 | Lair |  |
| 6,935,098 | B2 |   | 8/2005 | Bardagi et al. |  |
| 7,434,384 | B2 | * | 10/2008 | Lord et al. | 60/262 |
| 7,882,696 | B2 | * | 2/2011 | Anderson et al. | 60/262 |
| 2006/0207239 | A1 | * | 9/2006 | Anderson et al. | 60/262 |
| 2008/0302083 | A1 |   | 12/2008 | Marques et al. |  |

OTHER PUBLICATIONS

Yoshiya Nakamura, UK—Japan Bilateral Workshop on The Enviornmental Impact of Aircraft Emissions & Noise and Impact Reduction Technologies—"Japanese Activities on Engine Noise Technology—Focusing on SST and Small Subsonic Aircraft", Jan. 17-19, 2006, 16 Pages.

Stage III Technologies; www.stageiii.com/hushkit_ejector.asp; "Ejector", Jan. 2007, 3 Pages.

\* cited by examiner

*Primary Examiner* — Phutthiwat Wongwian
(74) *Attorney, Agent, or Firm* — Harness, Dickey & Pierce, P.L.C.

(57) ABSTRACT

An integrated, single piece mixer-center body ventilation apparatus is disclosed for use with a turbofan jet engine. The apparatus may incorporate a circumferential forward body portion adapted to be coupled to an aft end of a core engine turbine case of the jet engine, and a center body tube portion integrally formed with the forward body portion and having an axially opening vent exit. The forward body portion may have a plurality of inner mixer flow paths in communication with scalloped projecting portions. The inner mixer flow paths direct a pressurized core exhaust flow through the mixer device and mix the pressurized core exhaust flow with a portion of a pressurized fan exhaust flow, to thus significantly cool the pressurized core exhaust flow.

12 Claims, 31 Drawing Sheets

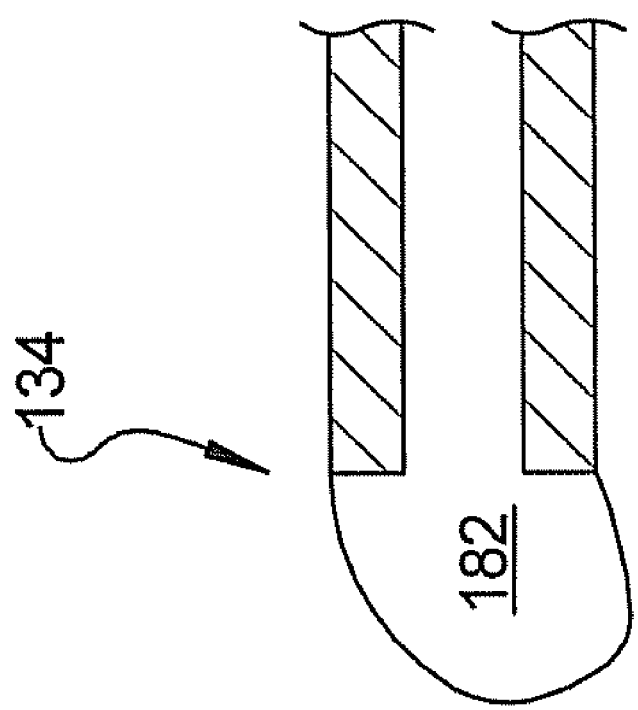

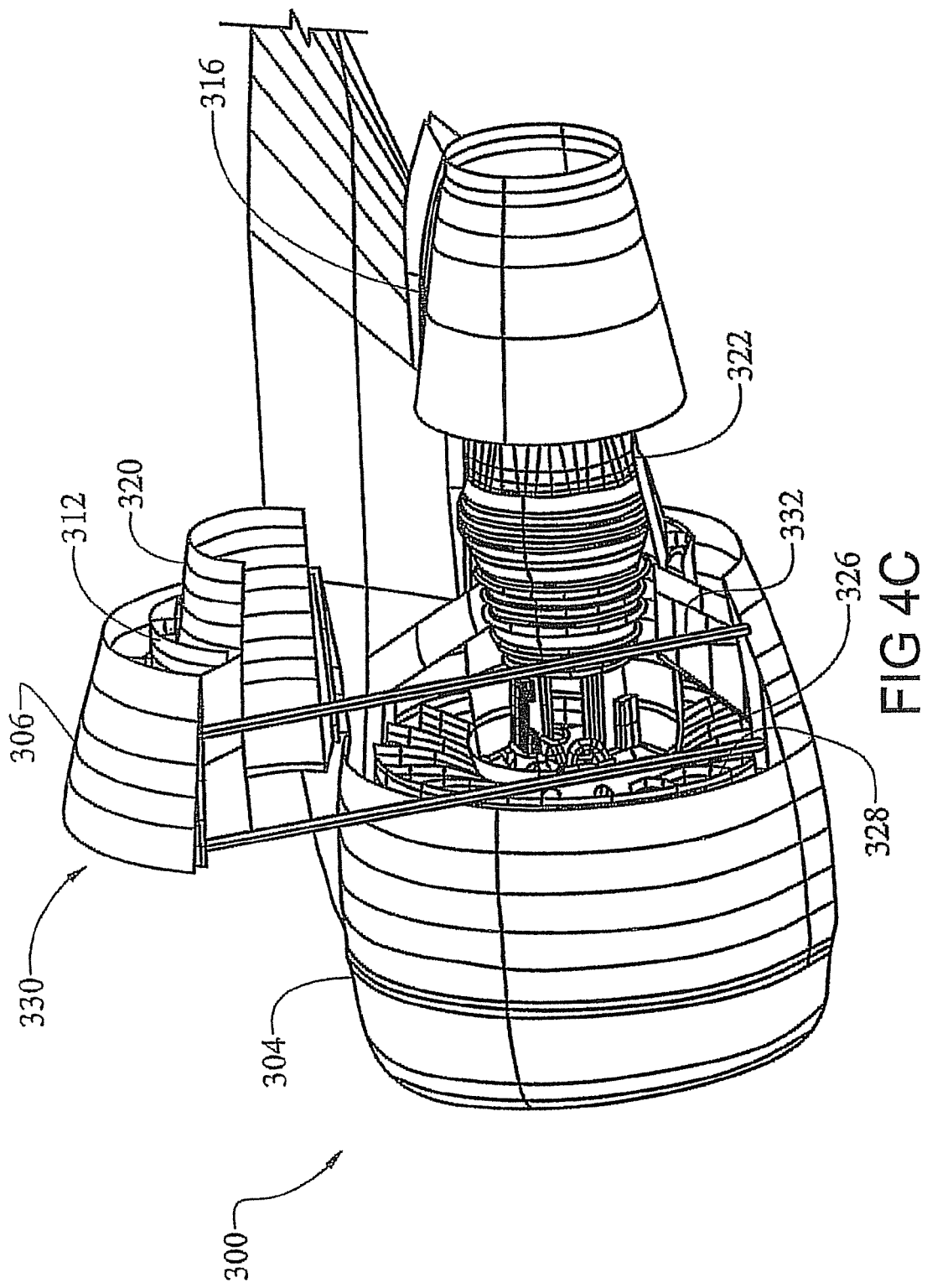

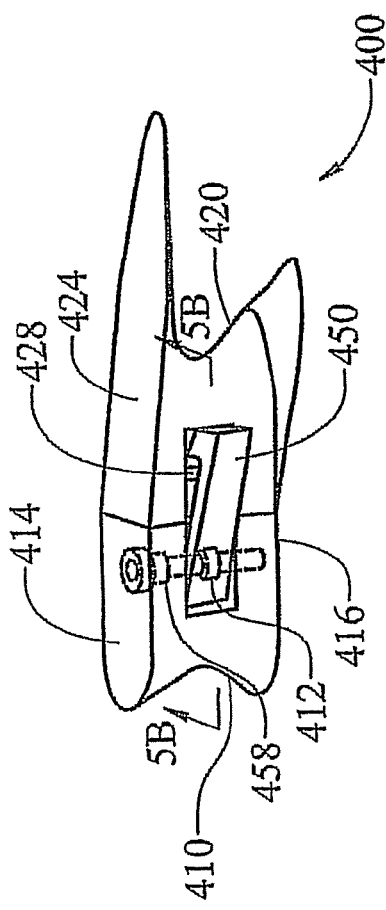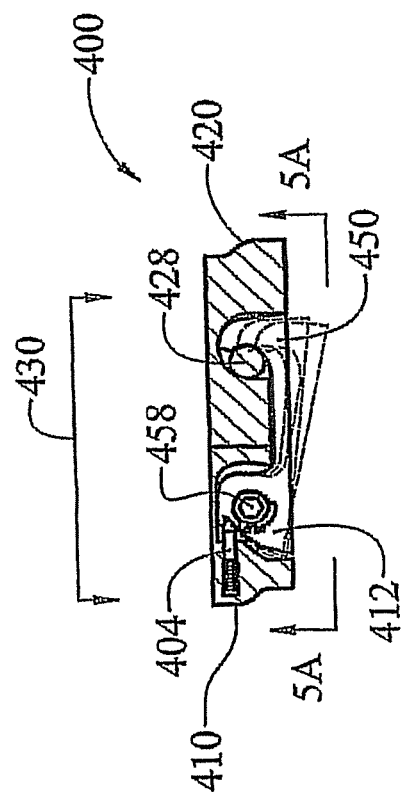
FIG 5A
FIG 5B

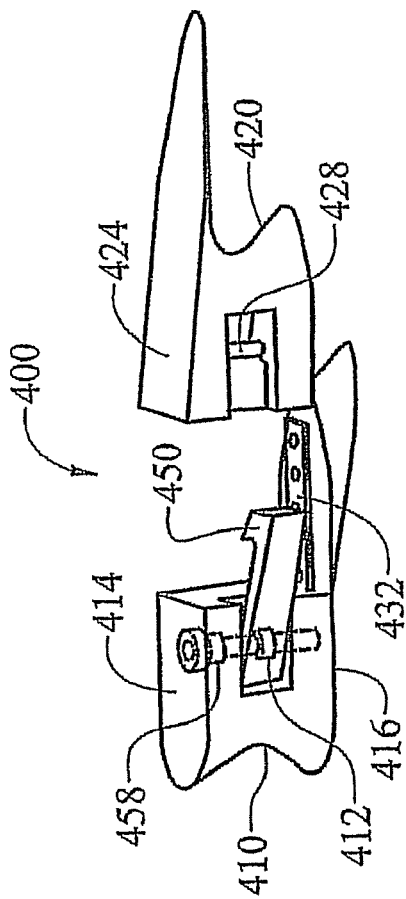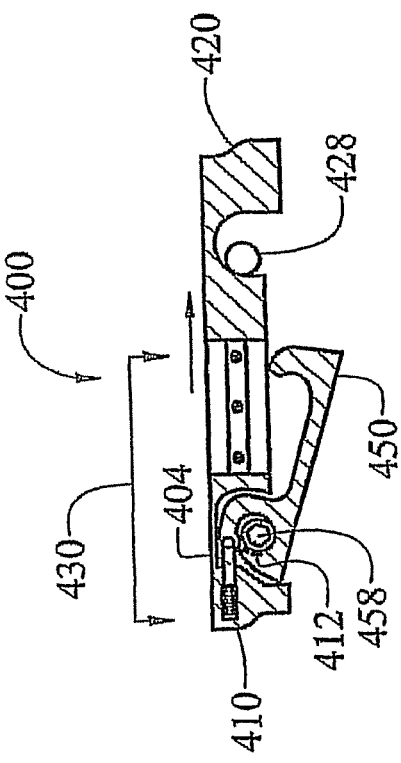
FIG 6
FIG 7

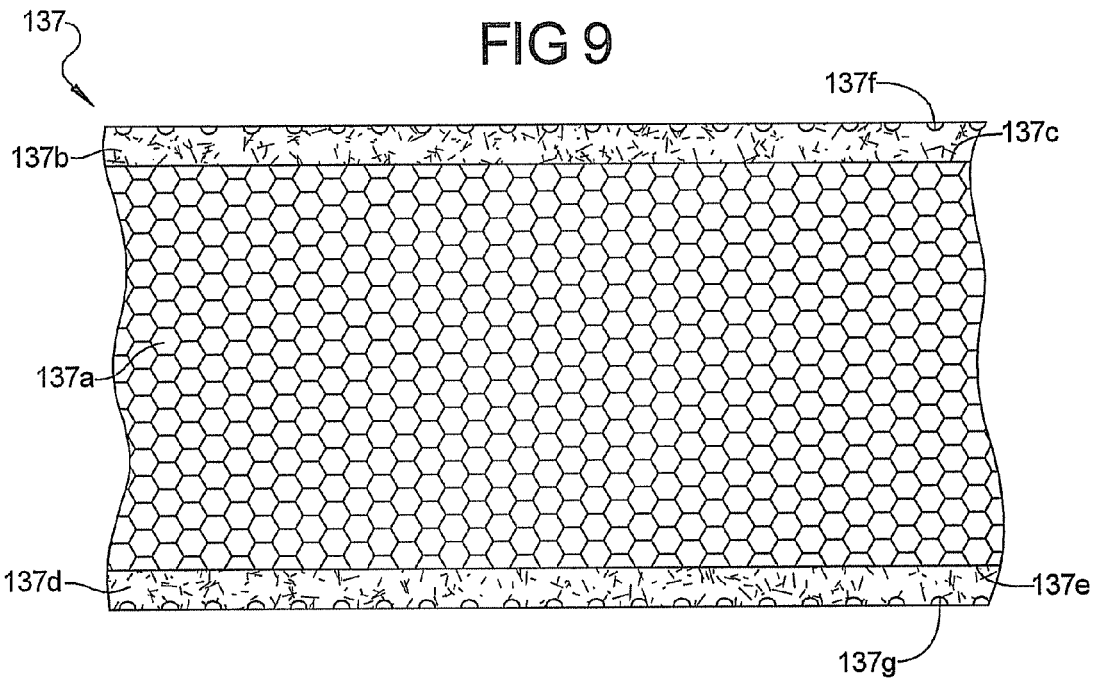
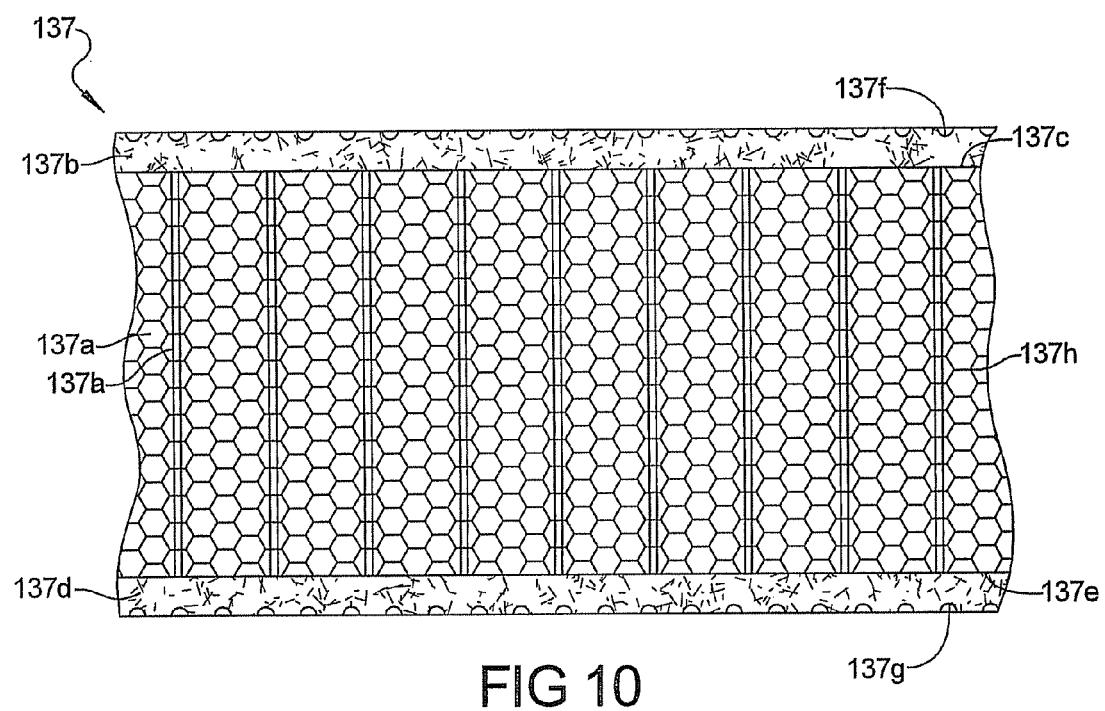

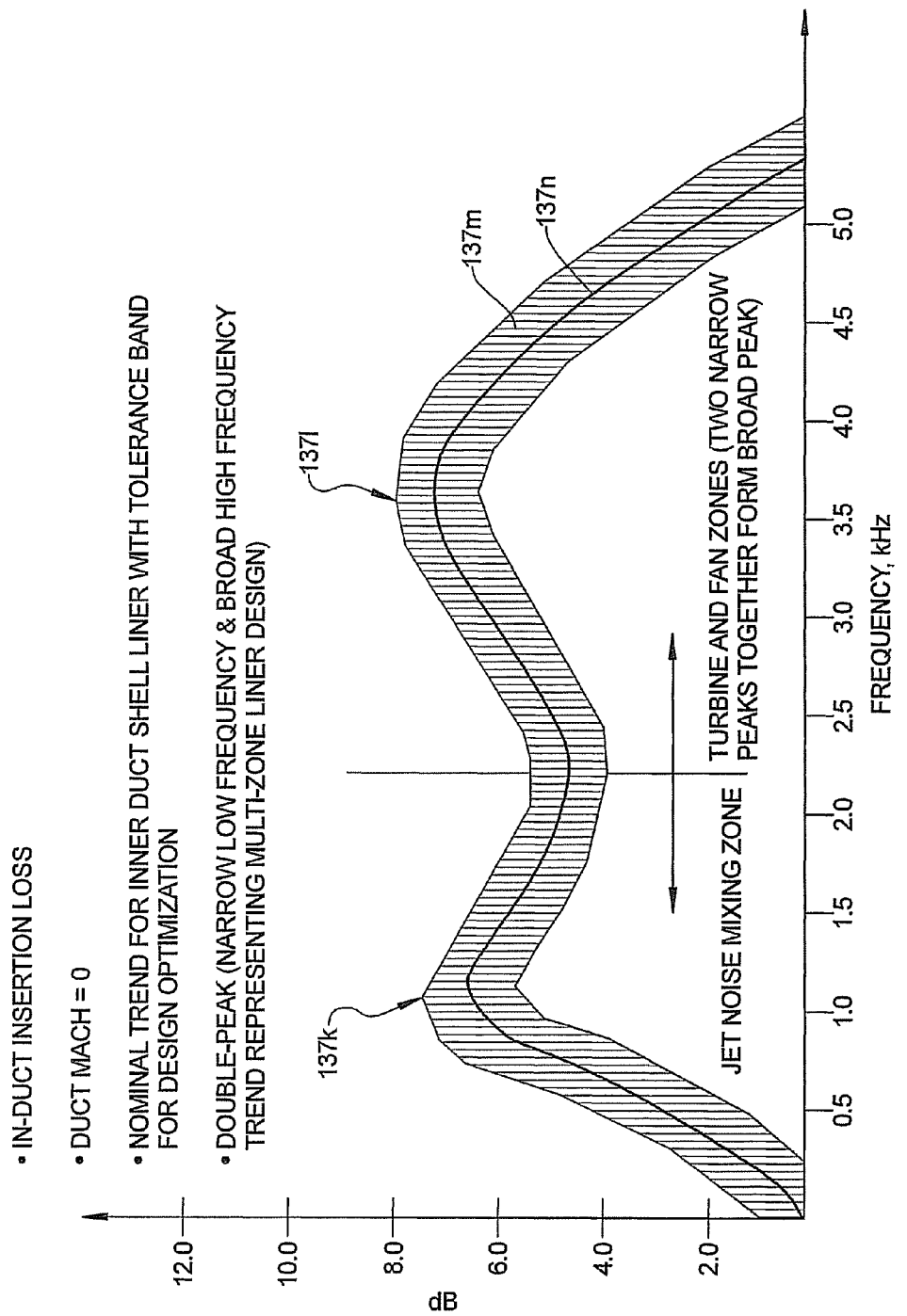

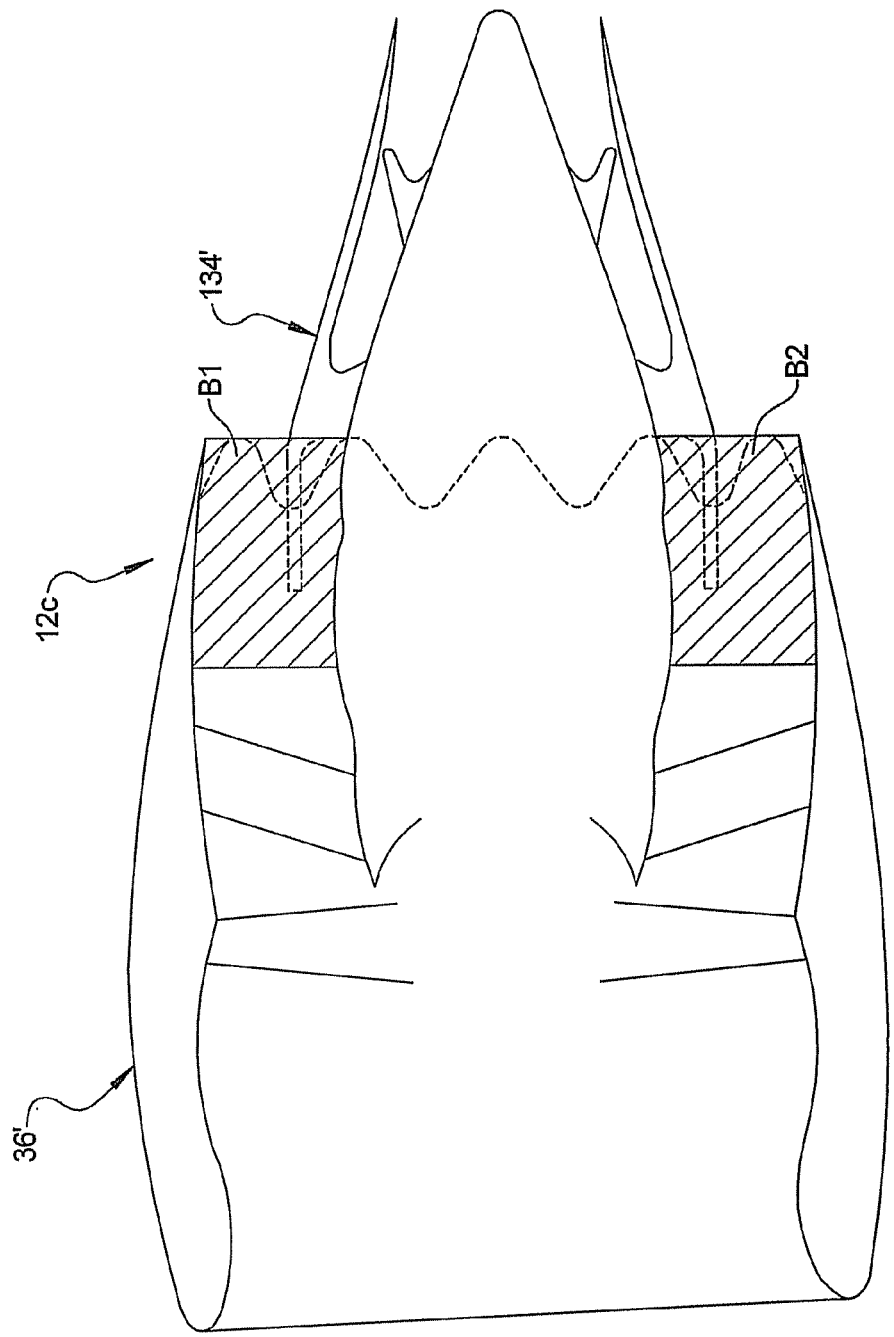

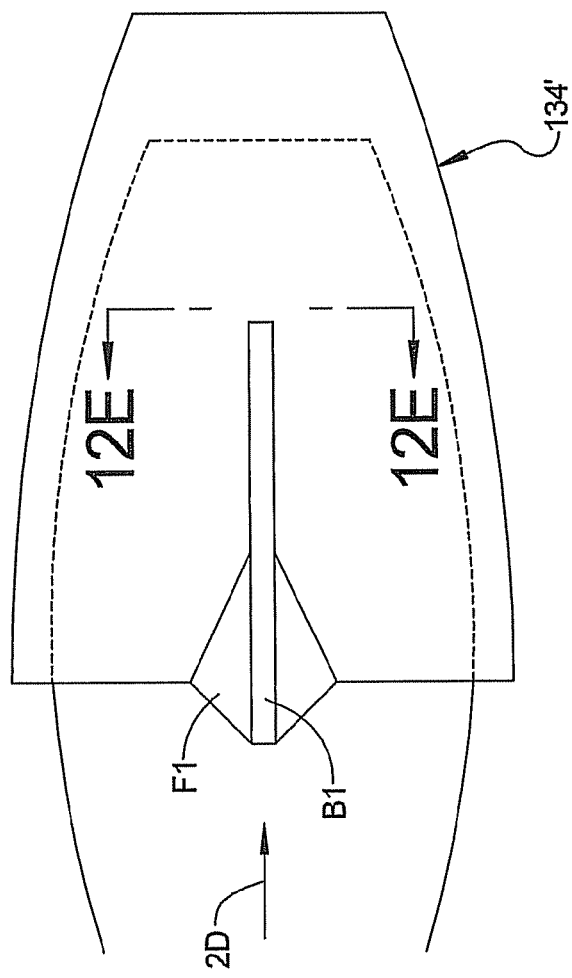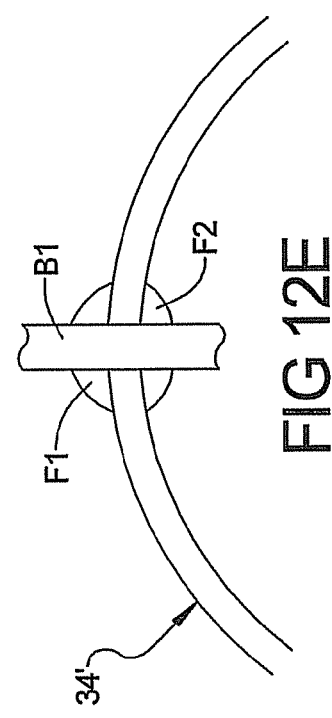

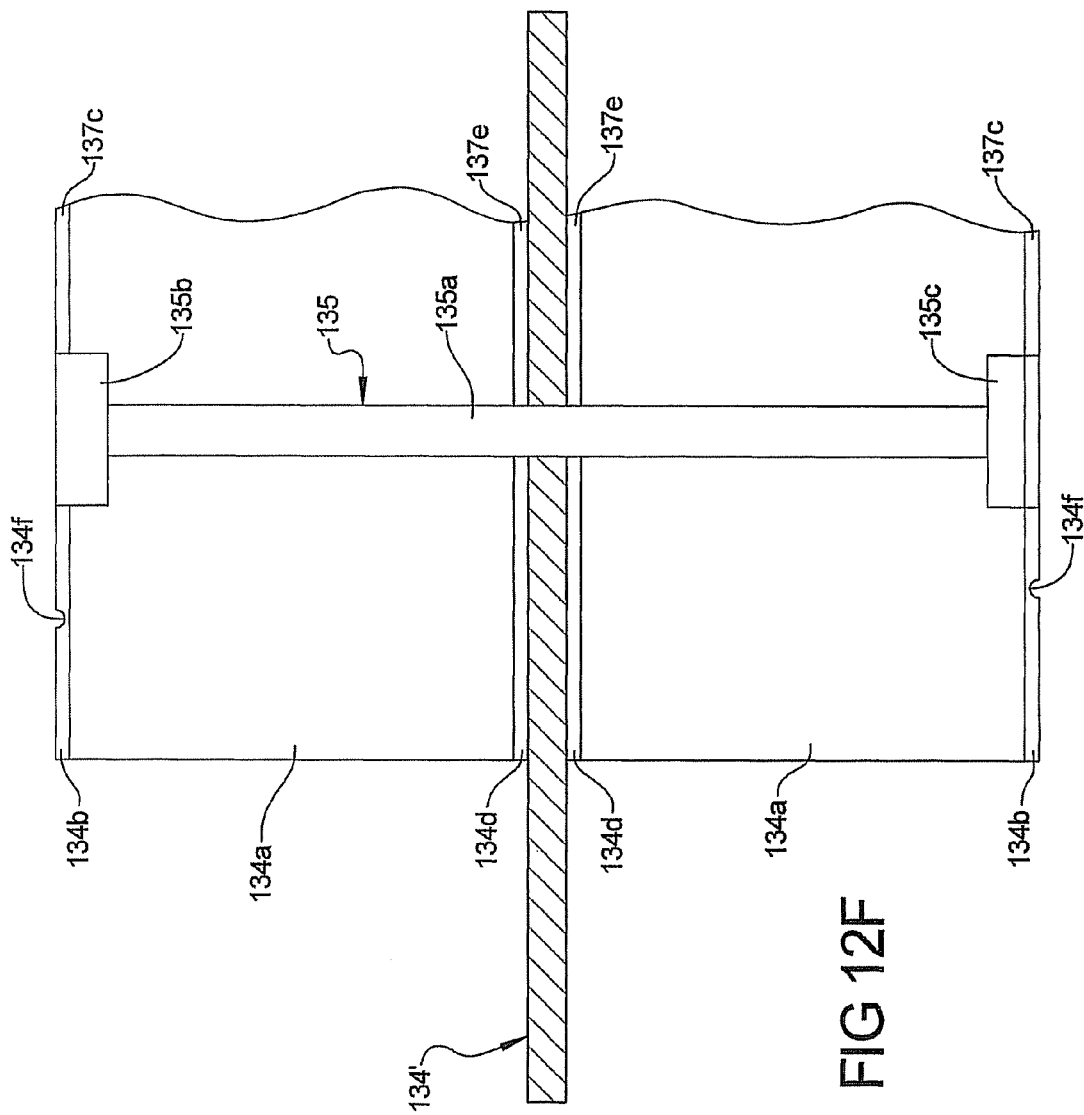

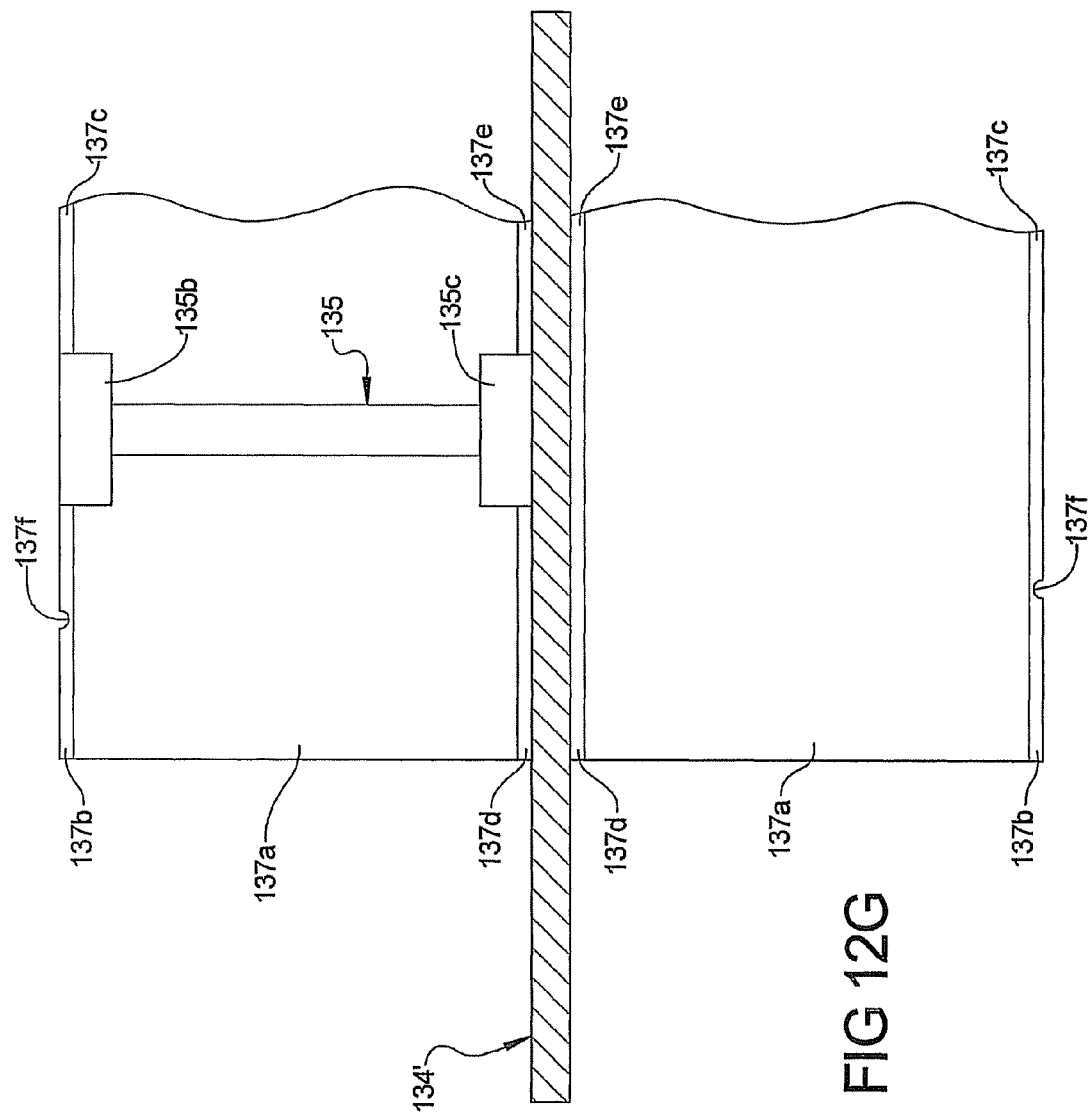

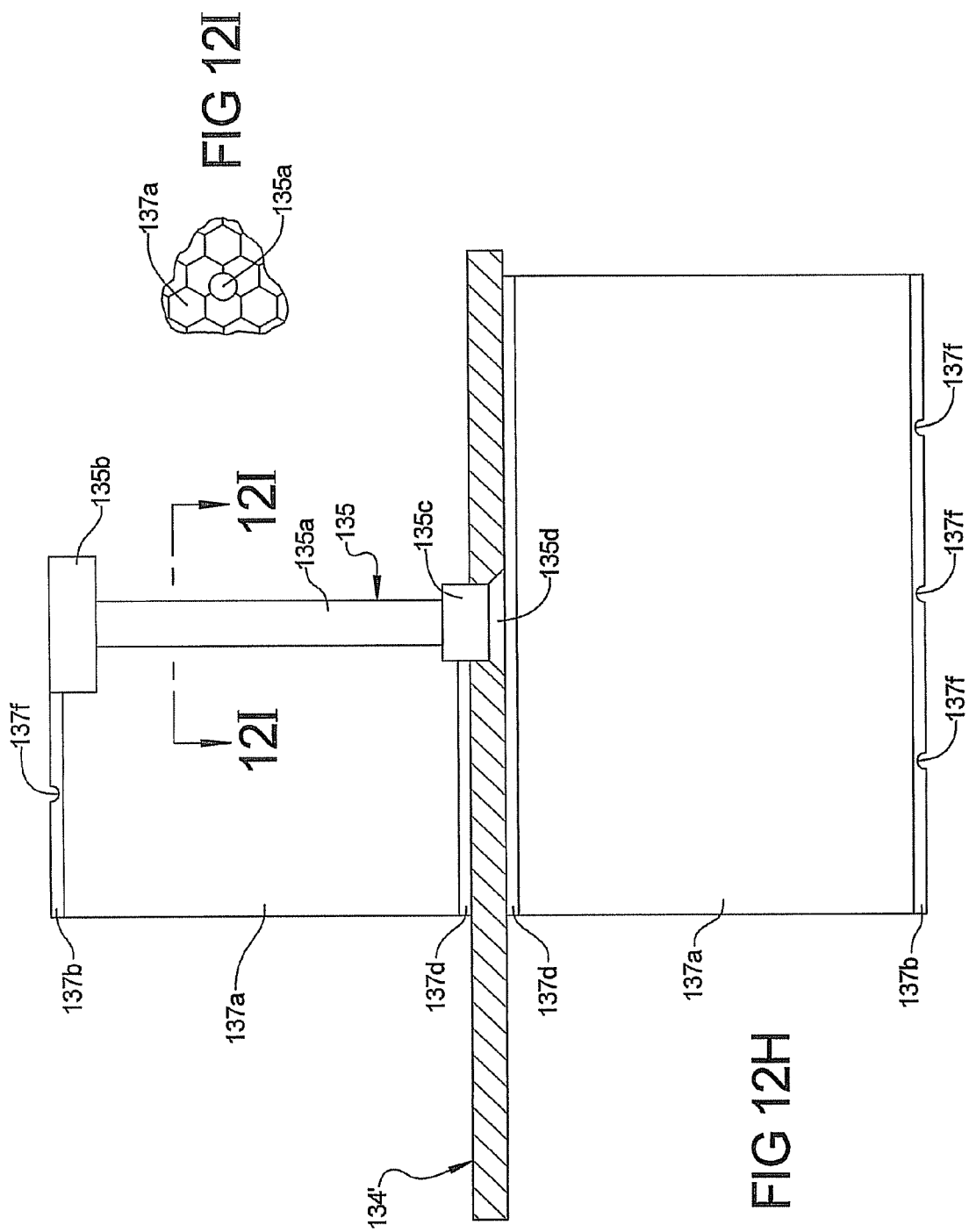

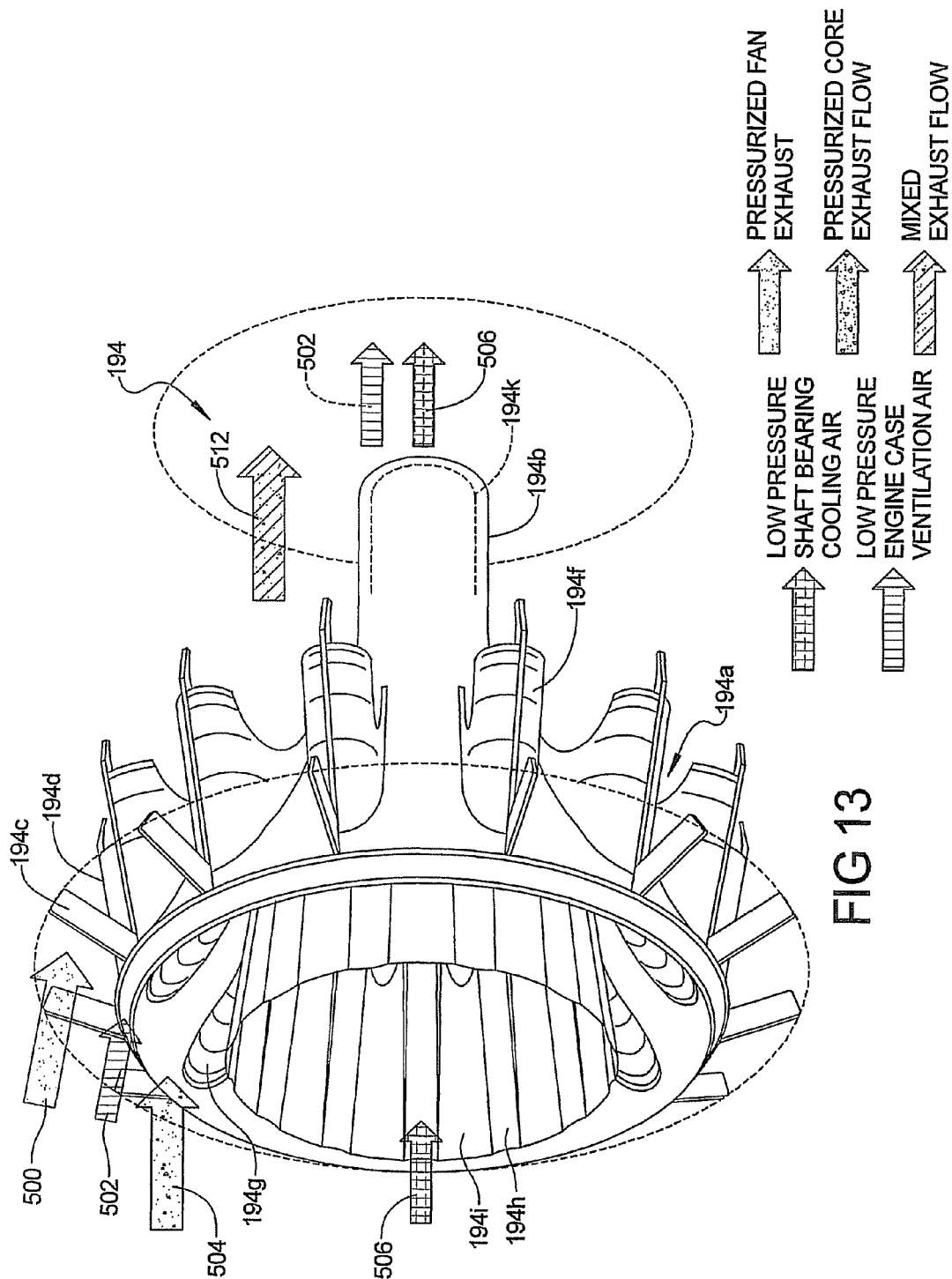

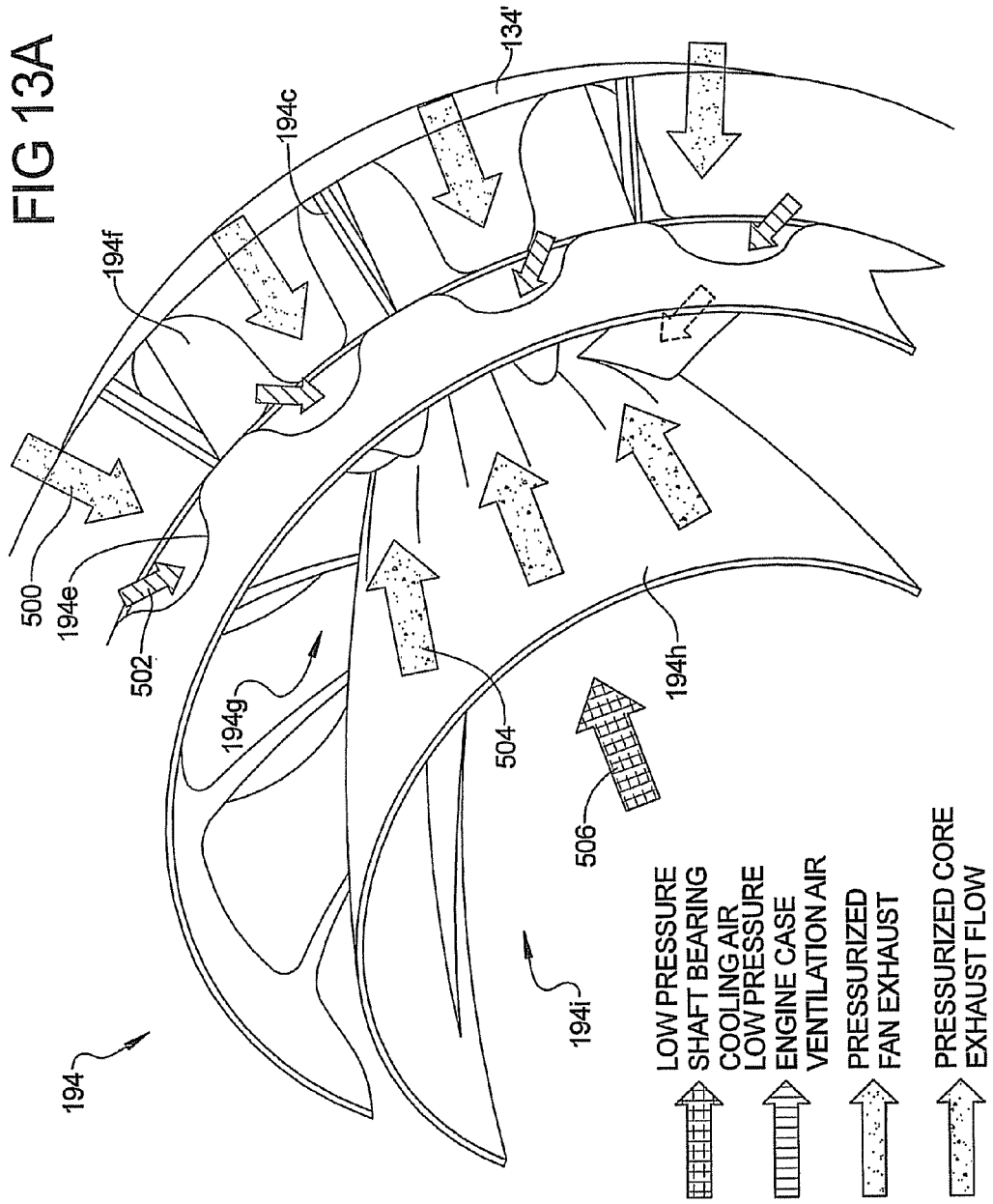

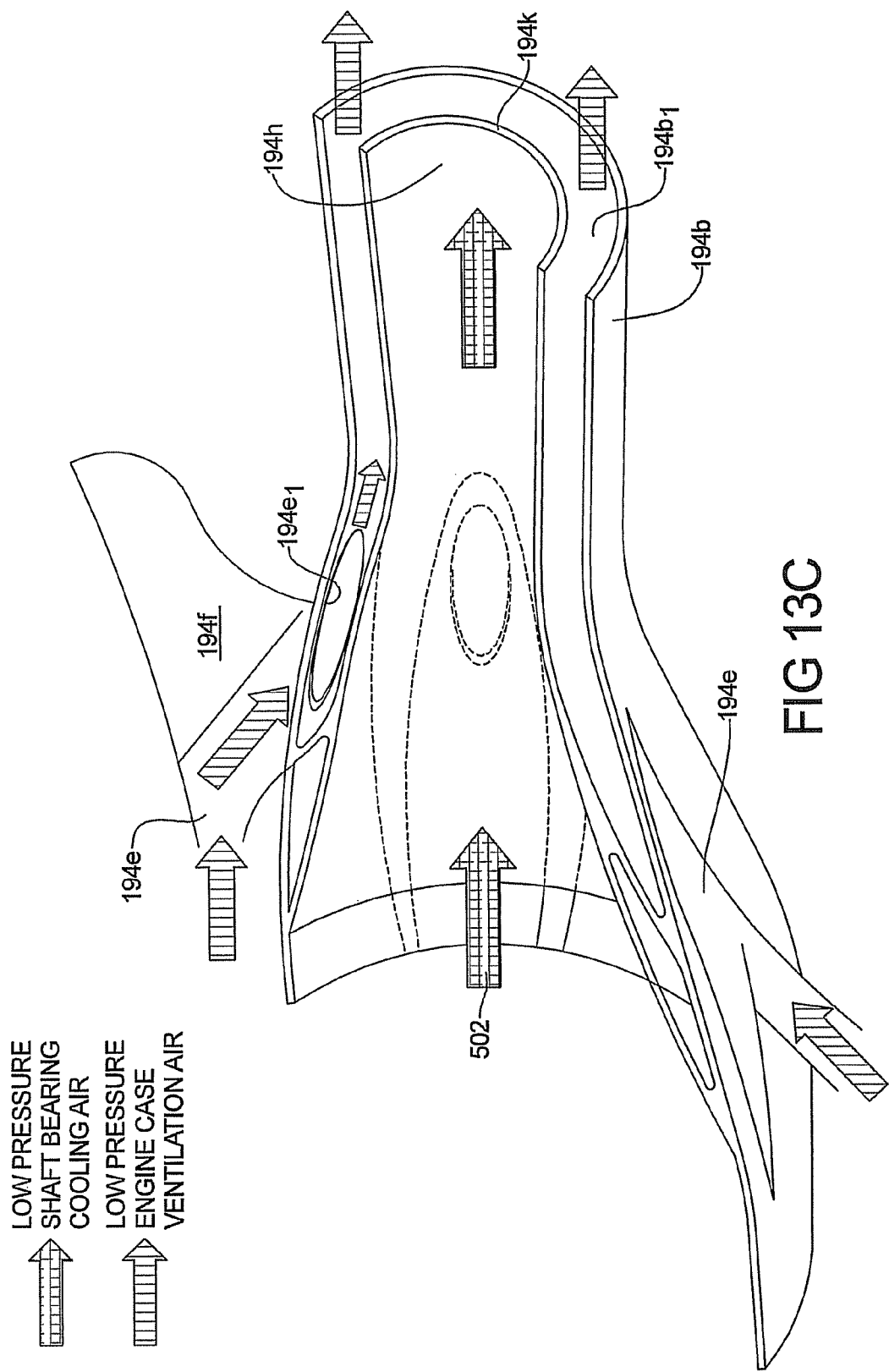

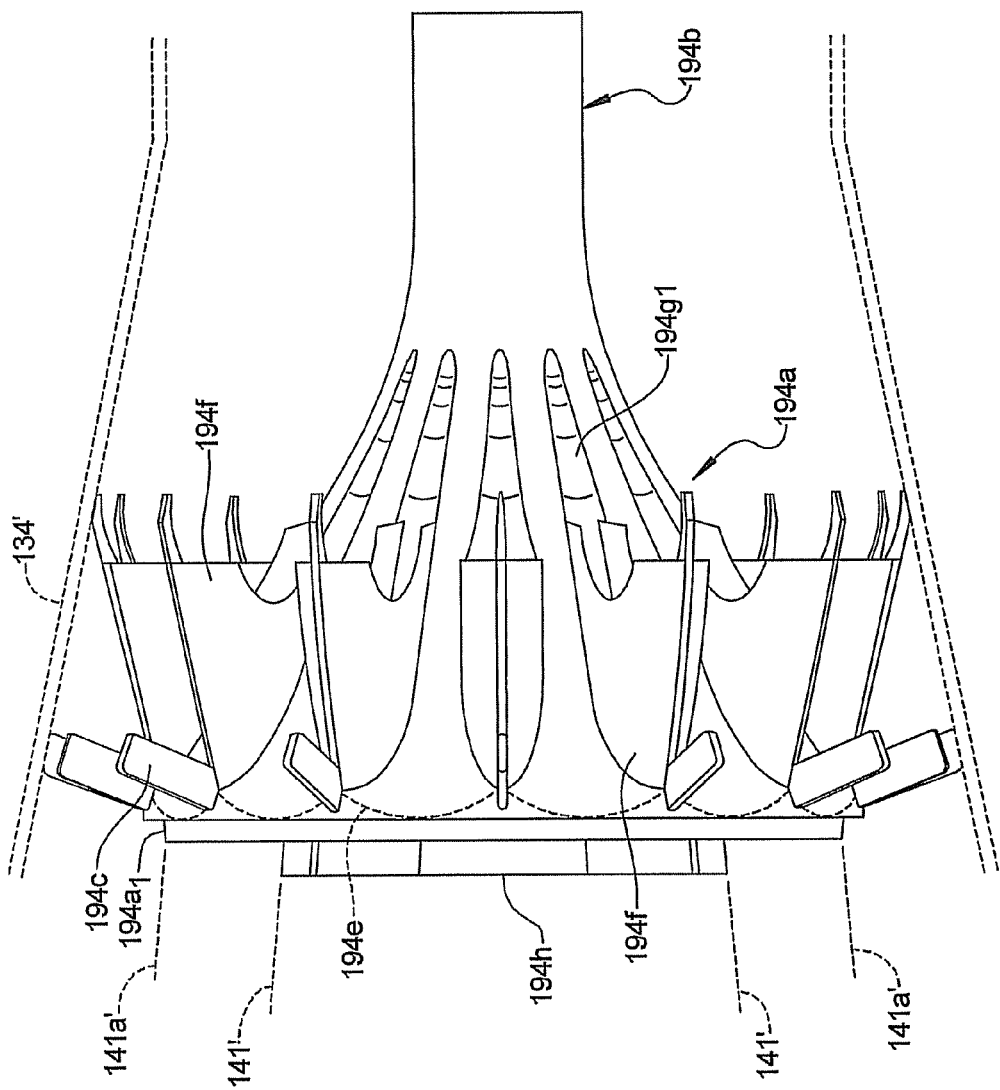

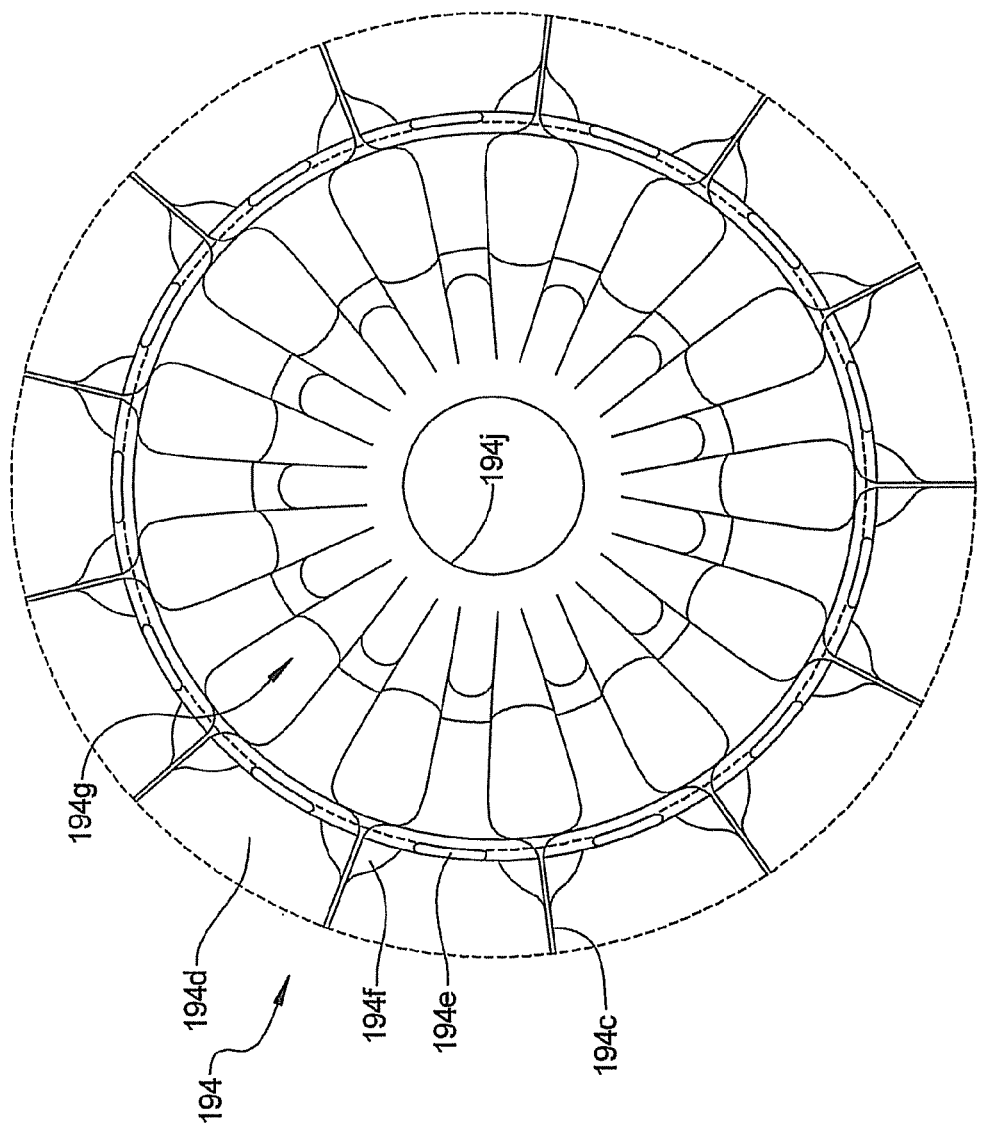

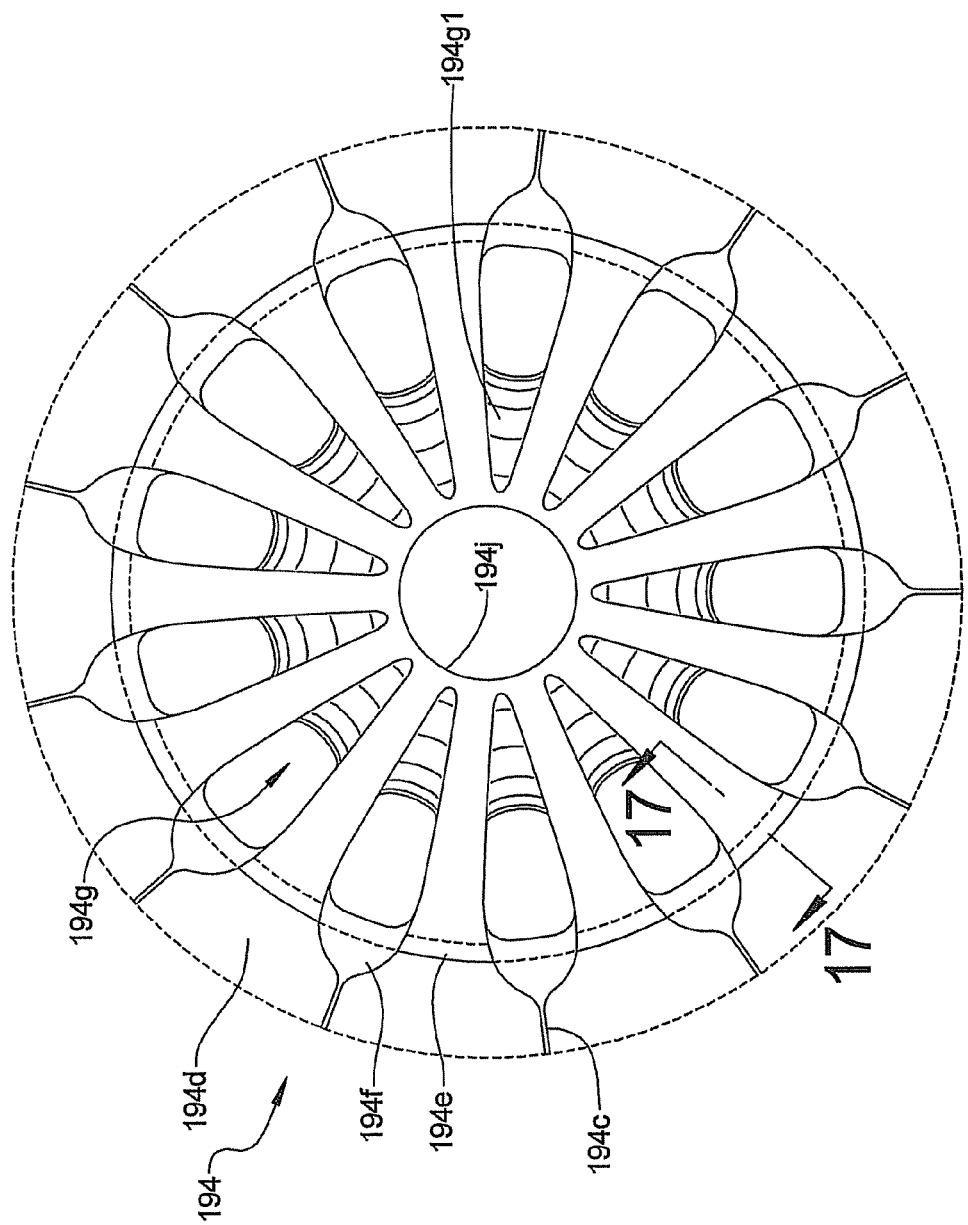

INTERNAL MIXING OF A PORTION OF FAN EXHAUST FLOW AND FULL CORE EXHAUST FLOW IN AIRCRAFT TURBOFAN ENGINES

CROSS-REFERENCE TO RELATED APPLICATIONS

This application is a continuation-in-part of U.S. patent application Ser. No. 11/758,406 filed on Jun. 5, 2007, and presently allowed. The entire contents of the foregoing application are incorporated by reference into the present application.

FIELD

The present disclosure relates generally to aircraft and, more particularly, to controlling noise and exhaust plume heat radiated from aircraft turbofan engines.

BACKGROUND

The statements in this section merely provide background information related to the present disclosure and may not constitute prior art.

In conventional aircraft, engines commonly are installed beneath the aircraft wings. Jet noise produced by the engines (most commonly, the "roar" heard at takeoff,) can radiate largely unabated to nearby communities. Engine exhaust noise can be amplified when the sound is reflected off undersurfaces of the wing or other aircraft surfaces. Heat emitted from the engine exhaust plume also tends to be reflected off of wings and pylons. In the case of military or derivative aircraft, this reflected heat can tend to increase susceptibility of turbofan-powered aircraft to heat-seeking missiles, when operated in threat environments.

SUMMARY

In one aspect the present disclosure relates to an integrated, single piece mixer-center body ventilation apparatus for use with a turbofan jet engine. The apparatus may incorporate a circumferential forward body portion adapted to be coupled to an aft end of a core engine turbine case of the jet engine, and a center body tube portion integrally formed with the forward body portion and having an axially opening vent exit. The forward body portion may have a plurality of inner mixer flow paths in communication with scalloped projecting portions. The inner mixer flow paths direct a pressurized core exhaust flow through the mixer device and mix the pressurized core exhaust flow with a portion of a pressurized fan exhaust flow, to thus significantly cool the pressurized core exhaust flow.

In another aspect the present disclosure relates to a turbofan jet engine comprising a core engine, an engine case for enclosing the core engine, and a core engine shroud for enclosing the engine case and defining a flow area there between. A single piece mixer-center body ventilation component is incorporated for mixing a portion of a pressurized fan exhaust flow flowing adjacent the core engine shroud with a pressurized core exhaust flow exiting the core engine, to significantly cool the pressurized core exhaust flow.

In still another aspect the present disclosure relates to a method for forming a turbofan jet engine. The method may comprise providing a core engine having a fan, with the fan generating a fan exhaust flow and the core engine generating a pressurized core exhaust flow. A core engine turbine case is provided for housing the core engine. A component attached to a back for the core engine turbine case receives the pressurized core exhaust flow and a portion of the fan exhaust flow. The component assists in causing the portion of the fan exhaust flow to be channeled into the pressurized core exhaust flow to thus cause mixing between the pressurized core exhaust flow and the portion of the fan exhaust flow, which causes cooling of the pressurized core exhaust flow.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2B is a view of a leading edge of a mixer duct shell of the engine assembly shown in FIG. 2A;

FIG. 4C is a perspective view of an engine assembly in accordance with one implementation of the disclosure, in which a movable aft portion of a mixer duct shell is positioned apart from a fixed forward portion of the shell, and an assembly of one side of an aft part of a short nacelle, core engine shroud and fixed portion of the mixer duct shell are raised together on a pylon mounted hinge and supported by attached rods;

FIG. 5A is a partial side perspective view of an attachment device in engaged position in accordance with one implementation of the disclosure;

FIG. 5B is a top view of the attachment device shown in FIG. 5A, the view taken along lines 5B-5B of FIG. 5A;

FIG. 6 is a partial side perspective view of an attachment device in disengaged position in accordance with one implementation of the disclosure;

FIG. 7 is a top view of the attachment device shown in FIG. 6;

FIG. 9 is a highly enlarged, cross sectional side view of a portion of an acoustic lining that may be included on the inner surface, the outer surface, or both inner and outer surfaces of the mixer duct shell of FIG. 8, and where the acoustic lining is shown formed by a pair of facesheets that may be arranged to sandwich a honeycomb core therebetween;

FIG. 10 is a highly enlarged, cross sectional side view of another form of acoustic lining that may be used with the mixer duct shell of FIG. 8, where the acoustic lining is formed by a pair of facesheets that may be disposed on one surface, or both opposing surfaces, of a honeycomb core, and with holes extending through the central honeycomb core of the acoustic lining;

FIG. 12B, is a graph illustrating exemplary insertion loss in decibels versus frequency for a double peak curve that represents a narrow low frequency band, where jet mixing noise is prevalent, and a broader high frequency band where the turbine and fan noise collectively form a single broader peak;

FIG. 12C is a simplified side view showing the upper and lower bifurcations that may be used to support the mixer duct shell within the short nacelle;

FIG. 12D is a simplified plan view looking down on the upper bifurcation shown in FIG. 12C, and illustrating the upper fairing that is used at the leading edge of the mixer duct shell and upper bifurcation interface;

FIG. 12E is a simplified front view looking at the fairing and bifurcation and mixer duct shell in accordance with directional arrow 12E in FIG. 12D, and illustrating the fairings used at the intersection of the upper bifurcation and the mixer duct shell;

FIG. 12F is a simplified side cross sectional side view showing a carry through element being used to extend through two acoustic lining elements placed on opposing surfaces of the mixer duct shell;

FIG. 12G is a simplified side cross sectional view of a carry through element extending through just one acoustic lining and being secured to an exterior surface of the mixer duct shell;

FIG. 12H is a simplified side cross sectional view of a carry through element extending through one acoustic lining and being secured to a countersunk fastening element in the mixer duct shell;

FIG. 12I is a plan view of a portion of the honeycomb structure of the acoustic lining showing how the corners are removed from intersecting cells to create a hole through which the carry through element may extend;

FIG. 13 is a perspective view of just the mixer shown in FIG. 8;

FIG. 13A is a perspective view of a portion of the mixer shown in FIG. 13 looking into the entrance of the mixer and into the plurality of mixer flow channels;

FIG. 13C is a partial perspective view of a portion of mixer showing one of the air flow vent paths formed therein for the engine case ventilation air, and another flow path formed therein for the engine shaft bearing cooling air;

FIG. 14 is a side view of the mixer of FIG. 13 that shows the mixer confined by the contour of the mixer duct shell;

FIG. 15 is a view looking into the entrance end of the mixer of FIG. 13;

FIG. 16 is a view looking directly into at the exit end of the mixer of FIG. 13;

DETAILED DESCRIPTION

The following description is merely exemplary in nature and is not intended to limit the present disclosure, application, or uses.

Figure 1:
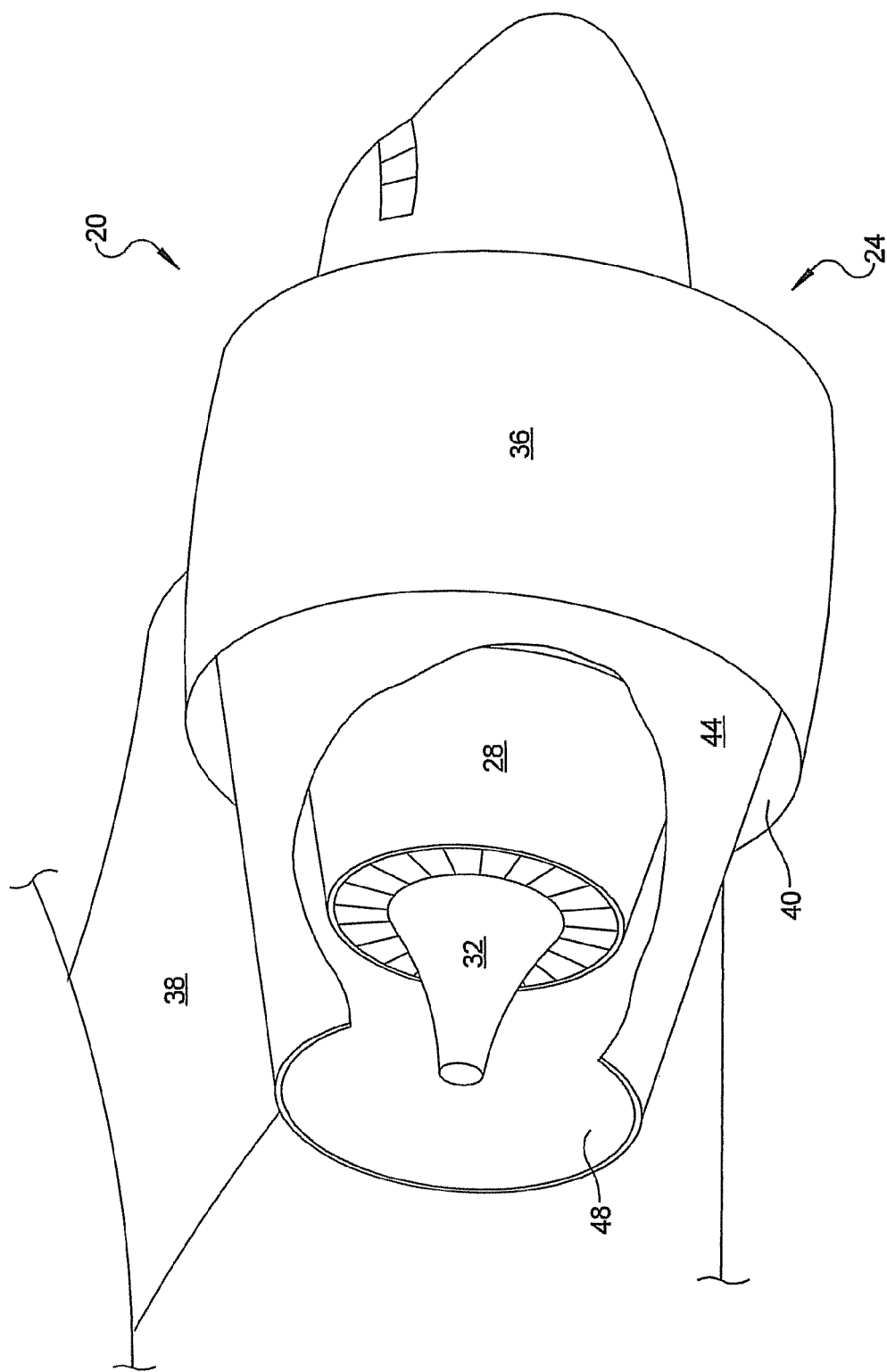
FIG. 1 is a partial right rear perspective view of an aircraft and engine assembly in accordance with one implementation of the disclosure, with a portion of a mixer duct shell cut away.

An aircraft adapted in accordance with one implementation of the disclosure is partially shown and indicated generally in FIG. 1 by reference number 20. The aircraft 20 has preferably one or more turbofan engine assemblies, one of which is shown in FIG. 1 and indicated generally by reference number 24. The engine assembly 24 includes a core engine 28 having an attached tail cone exhaust plug 32. The engine assembly 24 includes a short nacelle 36 mounted to a wing pylon 38. A "short" nacelle is one that is shorter than its associated core engine. Thus the short nacelle 36 provides a short fan duct 40 through which exhaust from a fan forward of the core engine 28 may exit the nacelle 36 alongside the shroud cover over the core engine 28.

One configuration of a mixer duct shell is indicated by reference number 44. A portion of the shell 44 is shown as having been cut away to partially expose the core engine 28. The shell 44 is substantially coaxial with both the fan duct 40 and shroud cover of the core engine 28. The shell 44 extends forwardly into the fan duct 40 to provide an interstitial mixer duct 48 between the shell 44 and both the shroud cover of the core engine 28 and the tail cone exhaust plug 32. As further described below, the fan duct 40 and interstitial mixer duct 48 are configured to provide a means of mixing a partial (e.g., a minority) amount of fan exhaust with the core engine exhaust and to bypass the other (e.g., majority) amount of fan exhaust out the exit of nacelle 36 alongside the outer surface of the mixer duct shell 44.

Figure 2A:
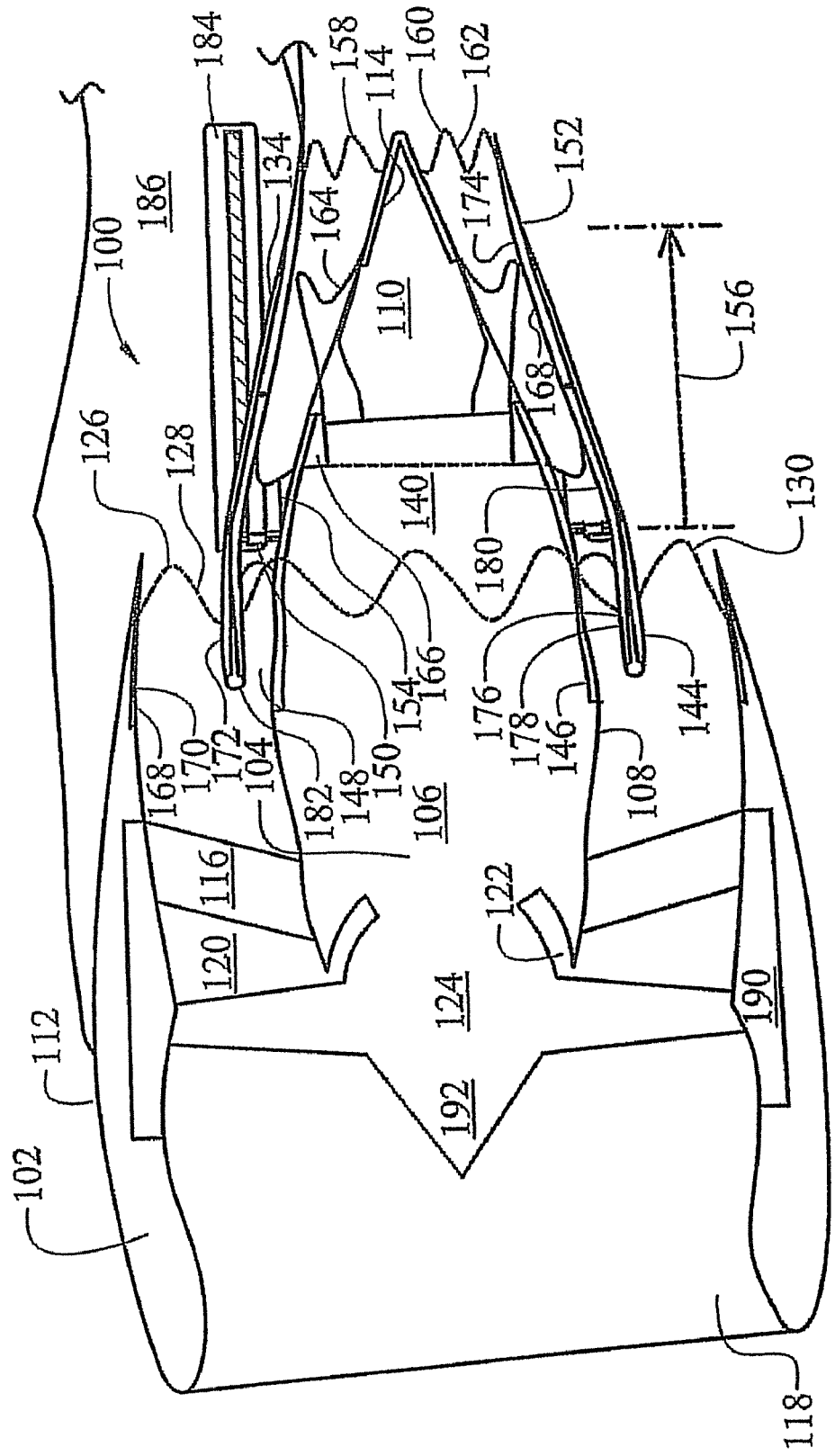
FIG. 2A is a longitudinal sectional diagrammatic view of an engine assembly in accordance with one implementation of the disclosure.

One configuration of an engine assembly is indicated generally in FIG. 2A by reference number 100. A short nacelle 102 is mounted around a forward portion 104 of a core engine 106. The core engine 106 is covered by a core engine shroud 108. The core engine 106 extends through and aft of the nacelle 102 and ends with a tail cone exhaust plug 110. The nacelle 102 includes a fan case frame 190 and nacelle shroud 112 mounted on the core engine 106 by struts 116. Air enters the nacelle 102 through a turbofan inlet 118 and travels through a fan pressurized duct 120. Air also enters core inlets 122 aft of a nose cone 192 and fan portion 124 of the core engine 106. The nacelle 102 has an exit nozzle 126. In the present exemplary embodiment, an edge 128 of the nozzle 126 includes a plurality of chevrons 130. It should be noted generally that engine assemblies having other short nacelle configurations could be adapted in accordance with principles of the disclosure. For example, in some implementations, a nacelle exit nozzle may include a variable area nozzle and not include chevrons.

One configuration of a mixer duct shell 134 is mounted on an aft portion 140 of the core engine 106. A forward portion 144 of the shell 134 extends forwardly into the nacelle exit nozzle 126 to provide an interstitial mixer duct 148 between the shell 134 and the shroud 108 extending over the core engine aft portion 140. A leading edge 182 of the shell 134 is shown in greater detail in FIG. 2B. The radius of the leading edge 182 is tailored for aerodynamic contouring that prevents flow separation that would otherwise cause a reduction in fuel efficiency and increased noise. The shell forward portion 144 is affixed to the core engine shroud 108 by a plurality of circumferentially spaced and aerodynamically tailored radial pillars 150. The pillars are preferably oriented in line with the crowns of a lobed mixer 164 to minimize noise. An aft portion 152 of the shell 134 may be moved in an aft-ward direction along a pillar slide 154 with weight supported on a sliding track 184 attached to an engine pylon sidewall 186. Moving the aft portion 152 provides access to underlying structure, e.g., access to portals for turbine inspections and access to sections of the shell 134 and aft core engine 140. An exemplary range of possible translation of the aft portion 152 is indicated by an arrow 156. The movable shell portion 134 has a convergent exit nozzle 158. In the present exemplary configuration, the nozzle 158 includes a plurality of chevrons 160 along a nozzle edge 162. Other or additional fixed or variable area nozzle configurations are contemplated, however, that do not include chevrons.

The lobed mixer 164 is positioned aft of a turbine frame section 166 of the core engine 106 and may be integrated with the tail cone exhaust plug 110. The lobed mixer 164 is high penetration to enhance mixing. Less penetrating mixers can also be incorporated as to optimize mixing versus duct-path flow losses. While lobed mixer prior art shows less than about 65% penetration due to greatly increased costs and diminished performance/noise payoffs, the inner duct height of the exemplary art is relatively small in comparison, so achieving almost 100% penetration is both desirable and not relatively cost prohibitive. The lobed mixer 164 may be scalloped as dictated by an optimum contour for the engine. The mixer 164 is positioned inside the shell 134 and upstream of the shell exit nozzle 158. It should be noted that configurations are contemplated in which other or additional means of mixing may be provided upstream of the mixer duct shell nozzle exit 158 Configurations also are contemplated in which no lobe mixer is provided.

In various configurations, the shell 134 is sufficiently cooled by the fan airflow during engine operation such that lower cost liners for acoustic absorption and/or debris containment may be structurally integrated into the engine assembly at minimal weight. Debris containment liners may be made, e.g., of woven composite. In various engine assembly configurations, various liners may be provided for reducing noise and/or for containing turbine fragments. For example, the engine assembly 100 includes an acoustic lining 168 covering as much of an inner surface wetted area 170 as practical. Acoustic lining 168 also may be provided, e.g., along part of an outer surface 172 of the shell fixed forward portion 144 opposite the nacelle inner surface 170, and on portions of a surface 146 of the core engine shroud 108. Acoustic lining 168 also may be provided, e.g., along part of an aft inner surface 174 of the shell movable aft portion 152 and on a conical trailing surface 114 of the exhaust plug 110. In some applications, the acoustic liners on the aft inner surface 174 and conical exhaust plug surface 114 are tuned for control of jet mixing noise. Containment liners 176 may be provided in the vicinity of the turbine frame section 166, e.g., along an inner surface 178 of the shell fixed forward portion 144 and along a forward inner surface 180 of the shell movable aft portion 152. It should be noted that acoustic and/or containment liners may be provided in various ways and locations, or not provided at all, dependent, e.g., on engine assembly structure and performance.

In some embodiments, the leading edge 182 of the shell 134 penetrates into the nacelle exit nozzle 126 sufficiently far to act as an aerodynamic inlet to the mixing duct 148 at fan stage pressure. The core engine shroud 108 may be re-contoured so as to allow penetration of the leading edge 182 to be for a minimal longitudinal length forward from the fan nozzle exit edge 128. For retrofit applications the core engine shroud 108 surface may be re-contoured inward opposing the thickened leading edge 182 to accommodate increased leading edge thickness without reducing cross sectional area for the portion of fan flow entering the interstitial mixing duct 148. Keeping a constant inlet cross-sectional area ensures that the entrance velocity is minimized and velocity dependent pressure losses are lowered as the fan air moves down the interstitial duct toward the mixer. In new engine applications, normal design methods will ensure that the duct work accommodates the correct flow path areas, at entrance, along the paths and at exit to optimize performance over the range of powered conditions. In generally all applications the mixer duct leading edge 182 is also positioned aft of a mechanism for thrust reversal and does not affect or inhibit thrust reverser function, reliability or reverse thrust generation. In some applications the core barrel shroud 108 has acoustic lining covering as much of the flow-wetted area as practical.

Figure 3A:
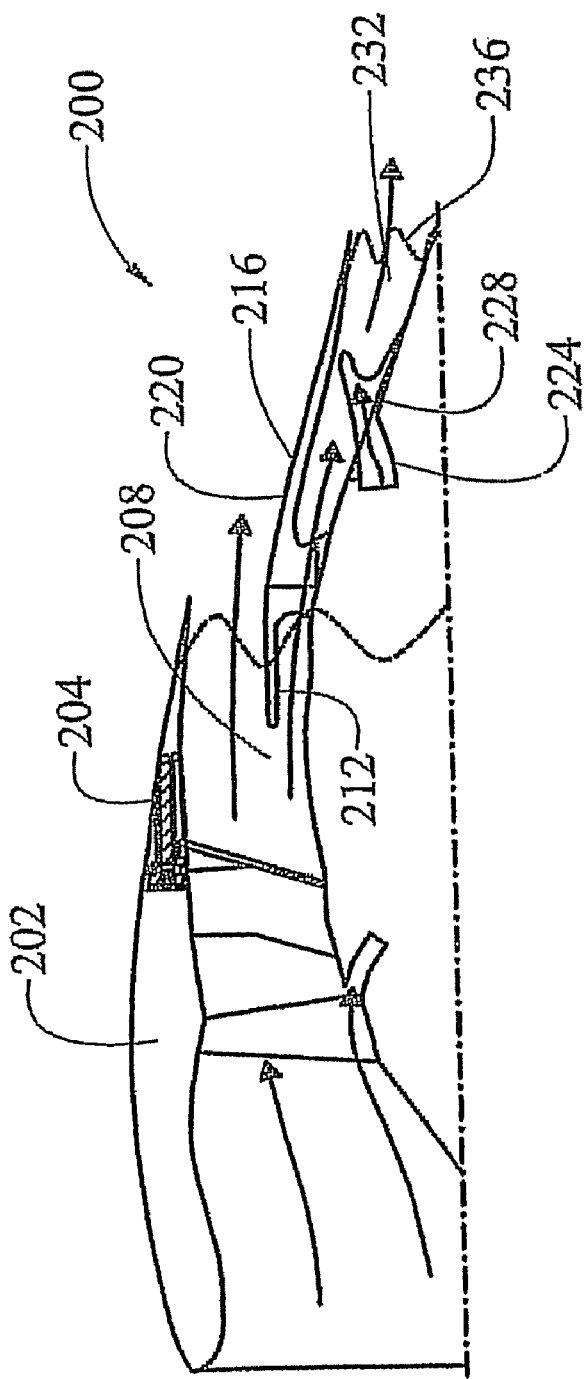
FIG. 3A is a partial longitudinal sectional diagrammatic view of an engine assembly in accordance with one implementation of the disclosure, in which a thrust reverser is in a retracted position.
Figure 3B:
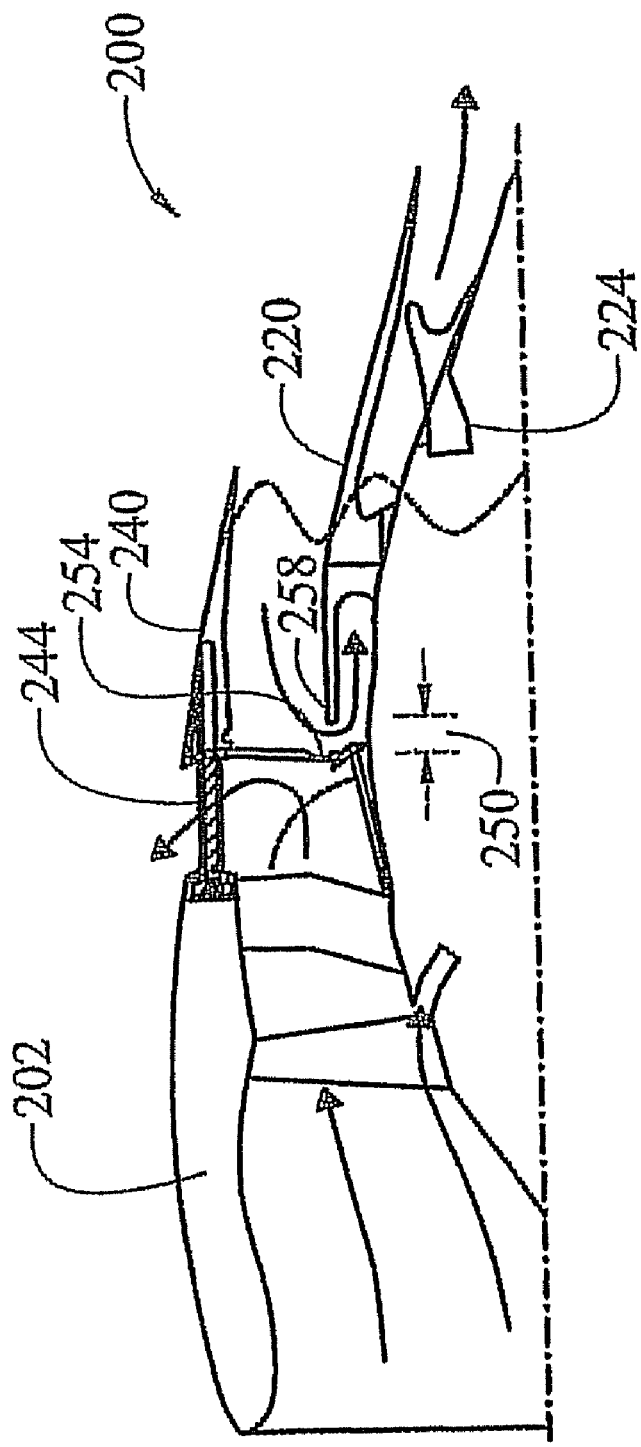
FIG. 3B is a partial longitudinal sectional diagrammatic view of an engine assembly in accordance with one implementation of the disclosure, in which a thrust reverser is in a deployed position.

An exemplary engine assembly is partially shown and indicated generally in FIGS. 3A and 3B by reference number 200. The assembly 200 includes a short nacelle 202. Referring to FIG. 3A, a thrust reverser 204 is in a retracted position. Fan exhaust 208 flows along both sides 212 and 216 of a mixer duct shell 220. Engine core exhaust 224 flows from a mixer 228 and is mixed internally with fan exhaust 208. Mixed exhaust 232 exits the engine assembly through a nozzle 236 of the shell 220. Referring to FIG. 3B, as a rear portion 240 of the nacelle 202 slides aft and, e.g., exposes "C shaped" cascade type reverser vanes 244, there are no interferences with the shell 220. During normal reverser operation, core flow 224 exits the mixer 228, but without interleaved fan flow, and thus tends to slow down (diffuse) through the nozzle exit 236—at a lower velocity than typically would be the case in the absence of the shell 220. A gap 250 between a deployed diverter gate 254 of the thrust reverser 204 and leading edge 258 of the mixer duct shell 220 determines a residual amount of cool air flow entrained backwards from the fan exhaust nozzle exit into the interstitial mixer duct by ejection effect of the diffused core exhaust flowing through the lobed mixer. This gap can be optimized, for a given implementation, to create adequate diffusion of core exhaust and sufficient backflow entrainment from the fan exit to keep mixer surfaces cooled and to lessen the residual forward thrust component. Thus, advantageously, net magnitude of reverse thrust (thrust reverser effectiveness) can be increased, for implementations with at least some types of thrust reversers.

In various implementations of the disclosure, an apportioned amount of pressurized fan air combined with core exhaust flow, e.g., a 2:1 mass flow ratio, can be captured and ducted. In typical current generation high-bypass engines (past generation were substantially less than 2:1) where the total fan air mass flow to turbine core flow ratio ranges from about 4.5:1 to greater than about 10:1, the apportioned mass flow ratio of 2:1 represents a minority portion of the fan duct mass flow. At about a 2:1 mass flow mixing ratio, a prior art scalloped lobe mixer can be used, e.g., to internally mix core exhaust to a core static temperature at least 200 degrees K. less than the temperature in an engine assembly in which such mixing is not performed and when the engine is at nearly full take-off thrust or climb thrust settings. Additionally in high thrust conditions, the 2:1 mixed core exhaust may exhibit a core velocity at least 250 feet per second less than the core velocity of an engine assembly in which mixing is not performed.

Figure 4A:
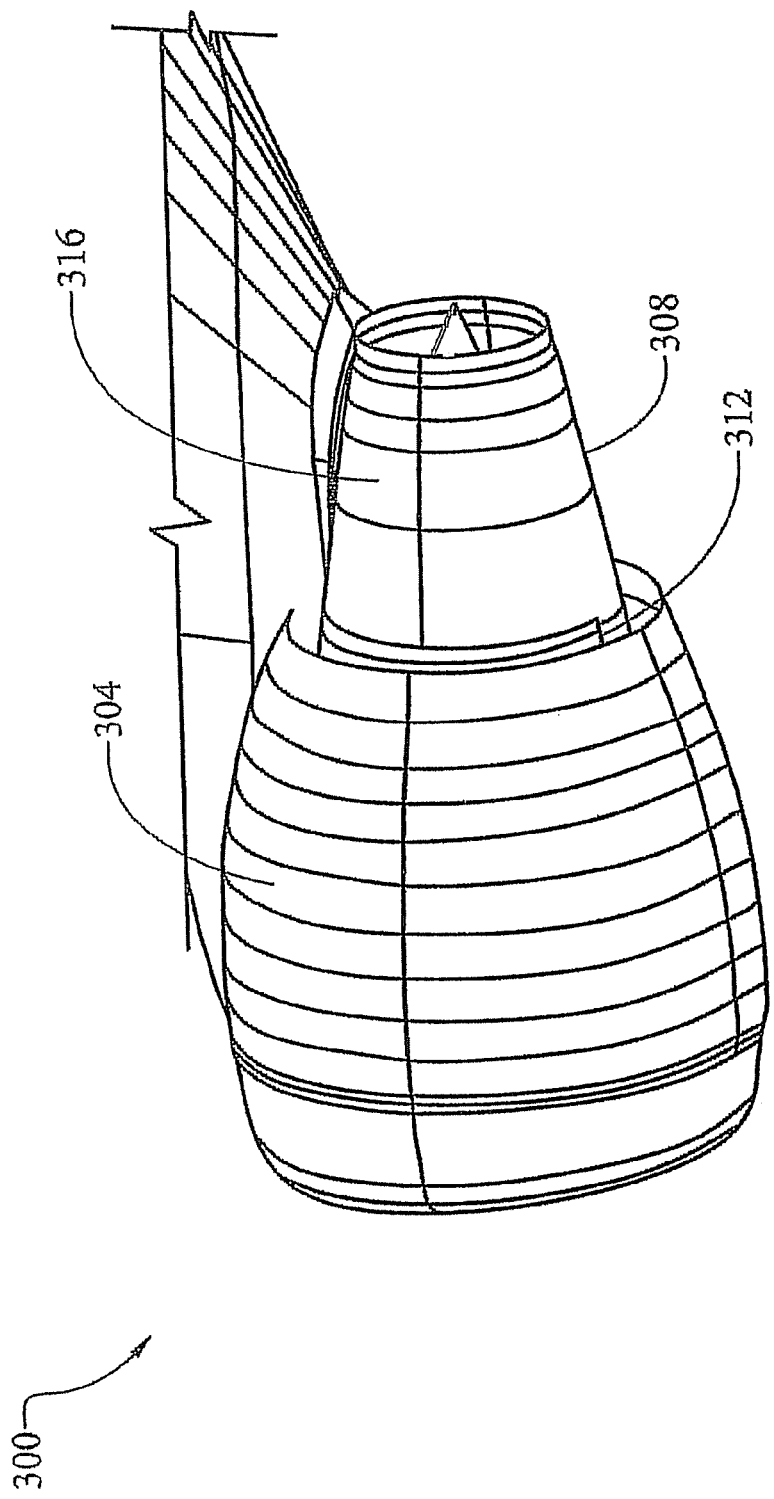
FIG. 4A is a perspective view of an engine assembly in accordance with one implementation of the disclosure, in which forward and aft portions of a mixer duct shell are contiguously positioned.
Figure 4B:
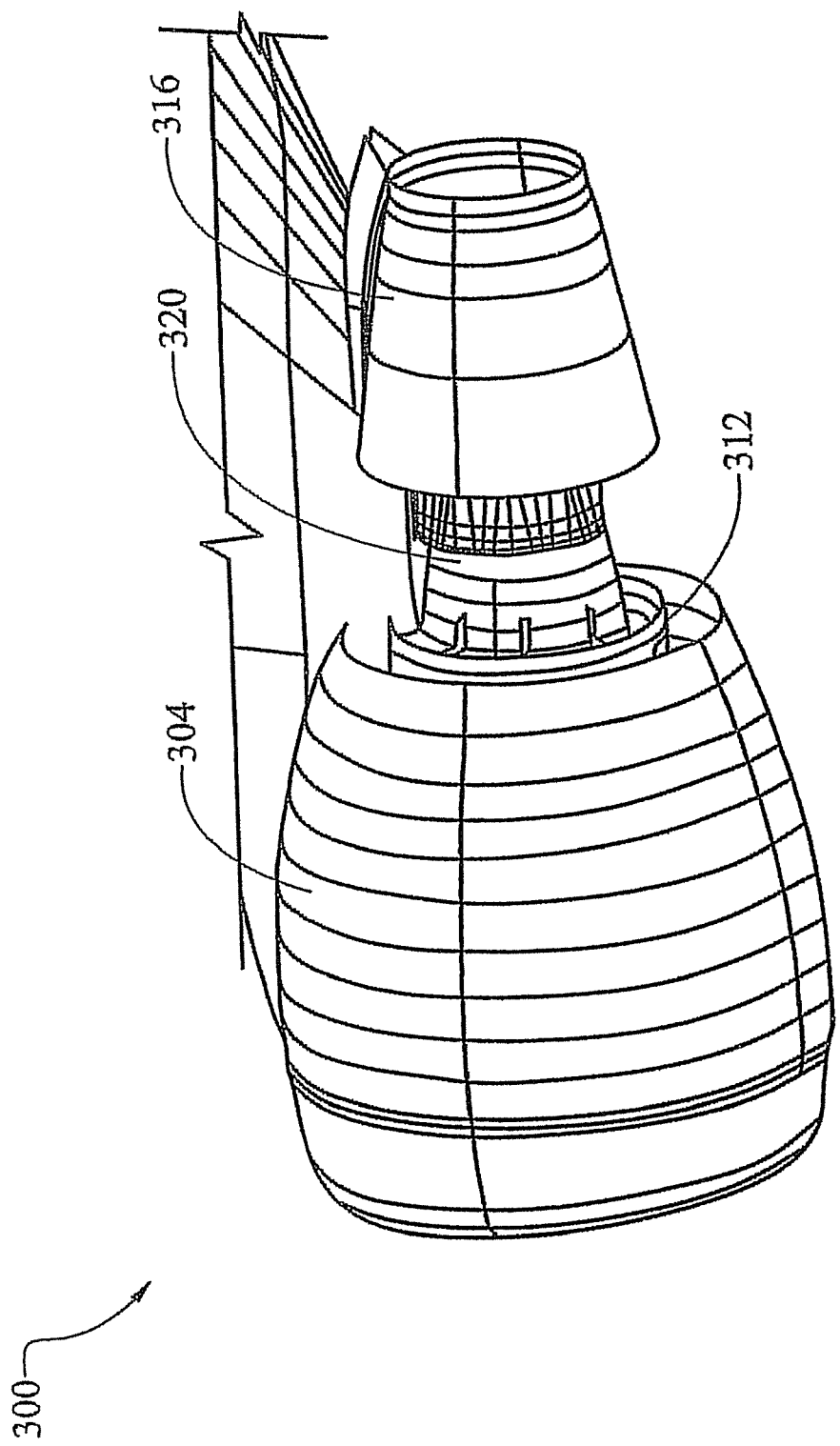
FIG. 4B is a perspective view of an engine assembly in accordance with one implementation of the disclosure, in which a movable aft portion of a mixer duct shell is positioned apart from a fixed forward portion of the shell to provide maintenance access to underlying aft engine hardware while the engine is not in operation.

As previously mentioned, for maintenance access, a mixer duct shell movable portion can be detached from an affixed portion of the shell and slid aft. One configuration of an engine assembly is indicated generally in FIGS. 4A, 4B, and 4C by reference number 300. The assembly 300 includes a short nacelle 304 and a mixer duct shell 308 having a fixed forward portion 312 and a movable aft portion 316. As shown in FIG. 4A, the forward and aft portions 312 and 316 are contiguous. As shown in FIG. 4B, the aft portion 316 is extended away from the forward portion 312 to expose part of an engine core shroud 320. As shown in FIG. 4C, for some turbofan engines, access can be gained to the engine core casing and components underneath an aft section 306 of the nacelle 304 and underneath the engine core shroud 320, forward of the lobed mixer 322. For such types of engines, the engine core shroud 320, the fixed portion of the mixer duct shell 312, and the aft section 306 of the fan nacelle 304 are joined as one duct assembly 330 on each side of the engine, forming two halves each hinged at the upper pylon seam and split at the lower centerline. The halves are detachable along a lower seam supported by structural frame member and lower bifurcation 326 extending aft from the forward fan case cowl and fan case frame 328. The duct assembly 330 can be raised and supported by rods 332 employing standard procedures to gain full access to the core engine, after the movable portion of the mixer duct 316 has been suitably detached and translated back, out of the way.

A forward portion of a mixer duct shell is fixedly supported from the forward parts of circumferentially spaced radial pillars that extend from the core engine shroud outward to an interior concentric surface of the mixer duct shell. One such pillar attachment device is indicated generally in FIGS. 5A-7 by reference number 400. A base surface 416 of a forward radial pillar part 410 is fixedly attached to the core engine shroud and the forward mixer duct shell is fixedly attached to an outward surface 414 of the forward radial pillar part 410. A movable mixer duct shell aft portion is fixedly attached to an outward surface 424 of an aft movable pillar part 420 of the attachment device 400. A plurality of circumferentially-spaced forward pillar parts 410 are attached to the mixer duct shell's forward portion to provide for its radial standoff from the engine core shroud, forming an interstitial mixer duct 148, shown in FIG. 2A. An equal plurality of aft pillar parts 420 are attached in clocked alignment with forward pillar parts 410. The aft pillar parts 420 slide longitudinally along dovetail keyed surfaces 432 built into the forward pillar parts 410. The keyed surfaces act as longitudinal guides and serve to further constrain azimuth clocking motions that could otherwise compromise the integrity of the shell part latch-up. The weight of the aft mixer shell and attached pillar aft parts 420 are supported by a rail slide 184 built into the sidewall of the engine pylon 186, as previously referenced in FIG. 2A. As shown in FIG. 6, the pillar parts 420 separate completely from their dovetail keyed sliding surfaces 432 as the movable portion of the mixer duct shell is slid aft ward. When slid forward back together as shown in FIG. 5A, the keyed sliding surfaces re-engage, thereby holding the sliding parts into alignment. Thus the attachment devices 400 permit the mixer duct shell aft portion to be released and slid longitudinally aft-ward quickly with full weight supported by the sliding track on the pylon and then slid back together quickly and re-engaged securely with a latch mechanism 430 built into pillar forward part 410.

When the movable portion of the mixer duct shell is slid into engagement, that is, when the pillar portions 420 and 410 are positioned into engagement, a rotating lock rod 458 with a hex (or alternate) head may be turned ninety degrees with a hex socket tool to securely lock each movable radial pillar part 420 to its adjacent fixed portion 410. FIG. 5B indicates the motion of a hooked latch 450, doweled catch 428, cam 412 on a lock rod 458 and a spring loaded pin 404 that adds resistance to the latch 450 while it is in the locked position so as to keep it held in tension on the catch 428. When the lock rod is rotated back for release as shown in FIG. 7, the spring loaded pin 404 and new position of the cam 412 cause the latch to spring open and remain open, freeing the movable portion 420 to slide aft. Thus the movable portion 420 may be secured or released by means of a plurality of (for example, eight) ninety-degree twists of the rotating lock rods 458. Supporting radial pillar portions 410 and 420 may be circumferentially spaced in coincidence with crowns of the lobes of a flow mixer, for example, the mixer 164 shown in FIG. 2A. Alignment of pillars 400 with mixer lobes reduces surface Mach numbers on the downstream lobes and reduces overall viscous losses.

Various implementations make it possible to incorporate additional acoustic absorbing liners and/or chevron nozzle treatments if desired. Acoustic liners may be, for example, porous honeycomb sandwich-style acoustic absorbers or bulk absorbing material manufactured from metallic, ceramic or composite material in a foam-like or generally porous fabrication. Such absorbers may be used, for example, to line at least a portion of a forward fan cowl and aft fan nozzle. Some implementations may include opposing acoustic liners and a liner structurally disposed on an outer surface of an affixed portion of the core engine shroud, mixer duct shell, inner surface of the mixer duct, and tail cone exhaust plug such as previously described with reference to FIG. 2A. Such linings may cooperate with a fan exit nozzle liner to absorb modal and broadband noise propagating aft-ward through engine bypass ductwork.

Referring again to FIG. 2A, the inner surface of the shell movable portion 152 near the aft mixed-jet nozzle 158 may also be structurally disposed with additional acoustic absorber lining. Such lining can diminish sound intensity of modal and/or broadband noise generated by the fuel combustor, rotating turbo-machinery, stator vanes, turbulent flow mixing and mixer trailing edges. In some configurations, application-specific, supplemental low-to-medium temperature-tolerant woven polymeric liners may be attached to inward facing surfaces of the mixer duct shell affixed portion 144 and forward segment of the inner surface of the movable portion 152, upstream of the lobed mixer 164. In such manner, containment may be enhanced, in an azimuthally directional fashion, of any hot turbine machinery debris that might be released and that might be capable of penetrating through the engine encasement, e.g., during destruction of the aft turbine area by guided missile impact. Directional characteristics of containment may be attained by placement of a containment liner with such a sub-tense of arc, that fragments that otherwise would impact and possibly penetrate wing skin, wing structure, control surfaces, engine support structure, or fuselage would have sufficient energy dissipated by the added protection layer. Advantageously, supplemental turbine-stage containment liners would in no way alter performance of normal fan-stage containment features.

Referring again to FIG. 2A, the outer core engine barrel 108 may be re-contoured to permit reduction of flow path losses from the interstitial mixer duct inlet through the surfaces of the lobed mixer and in application-specific configurations have additional acoustic lining, preferably encompassing as much of the wetted area as practical. The duct shell leading edge 182 is aerodynamically contoured to prevent separation and may be shaped to act as a low-loss flow inlet and may be positioned forward of the convergent section of the fan nozzle 126. In such manner, incoming gas velocity begins at a low fan duct velocity and pressure losses to the downstream mixer plane are minimized. Such a channeled gas path into the mixer duct 148 may remain diffused via subtle increase of the cross sectional area from the inlet area to slightly larger area as permitted by re-contouring the surface of the opposing core engine shroud 108. This may serve to further accommodate the radial thickness and outer flow line contour around the mixer duct shell 134 with minimal pressure loss in the contained flow path. The increased cross section may be retained through the fluid mixing device bounded by the inside of the mixer duct shell 134. Flow path tailoring is accomplished via the above re-contouring of the core engine shroud 108, shaping the mixer 164, and replacing the standard core nozzle with one of appropriately larger diameter. The contained flow path may remain adequately diffused at lower velocity until mixing is accomplished and the mixed outflow enters the convergent end of the nozzle exit 158.

The mixer 164 may be tailored for a low expansion rate and small core flow diffusion to accommodate lower scrubbing losses through the lobes. Lobe leading edge shapes may be broad, smooth and gradually tapered to precipitate a minimum in flow friction loss. Weight of the mixer and areas of surface affecting the scrubbing loss through the lobes may be reduced through scalloping the mixer's radial side walls. Scalloping of the mixer sidewalls enhances mixing prior to entering the convergent nozzle.

The above-described mixing can lower velocity differences and turbulent shear between mixer duct and fan bypass flows, resulting in much lower near-field and far-field radiated jet noise. The mixing function also can significantly reduce aircraft plume radiance, thereby lowering susceptibility and increasing ability to defend with onboard defensive jamming systems reliant upon IR sensors that view outward to point toward and track the threat—potentially through own-plume self obscurations. In cases where there may be additional desire to reduce visibility or apparent temperature of hot metal exhaust parts, such reductions may be accomplished within the scope of this disclosure using various implementations of alternative mixer device designs: ones that impinge more cool airflow onto the aft exhaust plug surface, ones that utilize commercial or non-commercial low-emissivity coatings, and ones that twist the mixer surfaces so as to inhibit visibility to high temperature turbine areas and guide vanes. Various implementations of this disclosure are contemplated to employ any of a variety of mixer designs, or no mixer at all, to accomplish the reduction of radiated heat.

The structural integration of acoustic liners and debris containment liners can enhance reduction of interior engine cavity noise and can provide additional containment barriers for impact-generated debris, e.g., in cases where the aircraft engine cannot be defended against impact by IR guided missiles. The mixer duct shell attachment structure serves to permit support of the weight of the movable portion of the shell and facilitates its movement aft-ward to expose interior surfaces and parts for easier maintenance. In addition, the attachment structure facilitates moving the mixer duct shell aft-ward, thereby allowing use of normal maintenance procedures on modern turbofan engines that raise and support nacelle assembly halves to expose the core engine for easy maintenance. The affixed portion of the mixer duct inlet is positioned such that no interference is generated with the mechanisms and functions of the thrust reversers, and is also uniquely tailored to not induce self-noise or entrance flow losses. The above flow path features, including diffusion and flow shaping, can reduce flow path losses in the interstitial mixer duct up to and through the radial blending of the two flows, prior to entrance into the convergent mixed nozzle exit.

The foregoing discussion can be seen to describe a method for controlling exhaust plume heat and noise radiation from an aircraft turbofan engine assembly. A first portion of fan exhaust is routed through an interstitial mixer duct formed between an inner surface of a mixer duct shell and a core engine shroud of the engine assembly to a nozzle through which engine exhaust passes. A second portion of fan exhaust is routed over an outer surface of the mixer duct shell.

A nacelle mixing design implemented in accordance with the disclosure promotes internal mixing and can substantially slow jet velocities at the exit of an aircraft engine. Various implementations can simultaneously reduce take-off and landing airport community aircraft noise, cruise aft-cabin shock-cell noise and infrared plume emissions of turbofan powered aircraft. The foregoing engine assembly can locally absorb additional damage that might be induced by high-velocity debris released into areas surrounding the aft engine system should the aft engine portion on an aircraft be impacted, e.g., by a heat seeking missile, protecting against possible collateral damage to fuel tanks, wing structures, control surfaces and/or fuselage.

Figure 8:
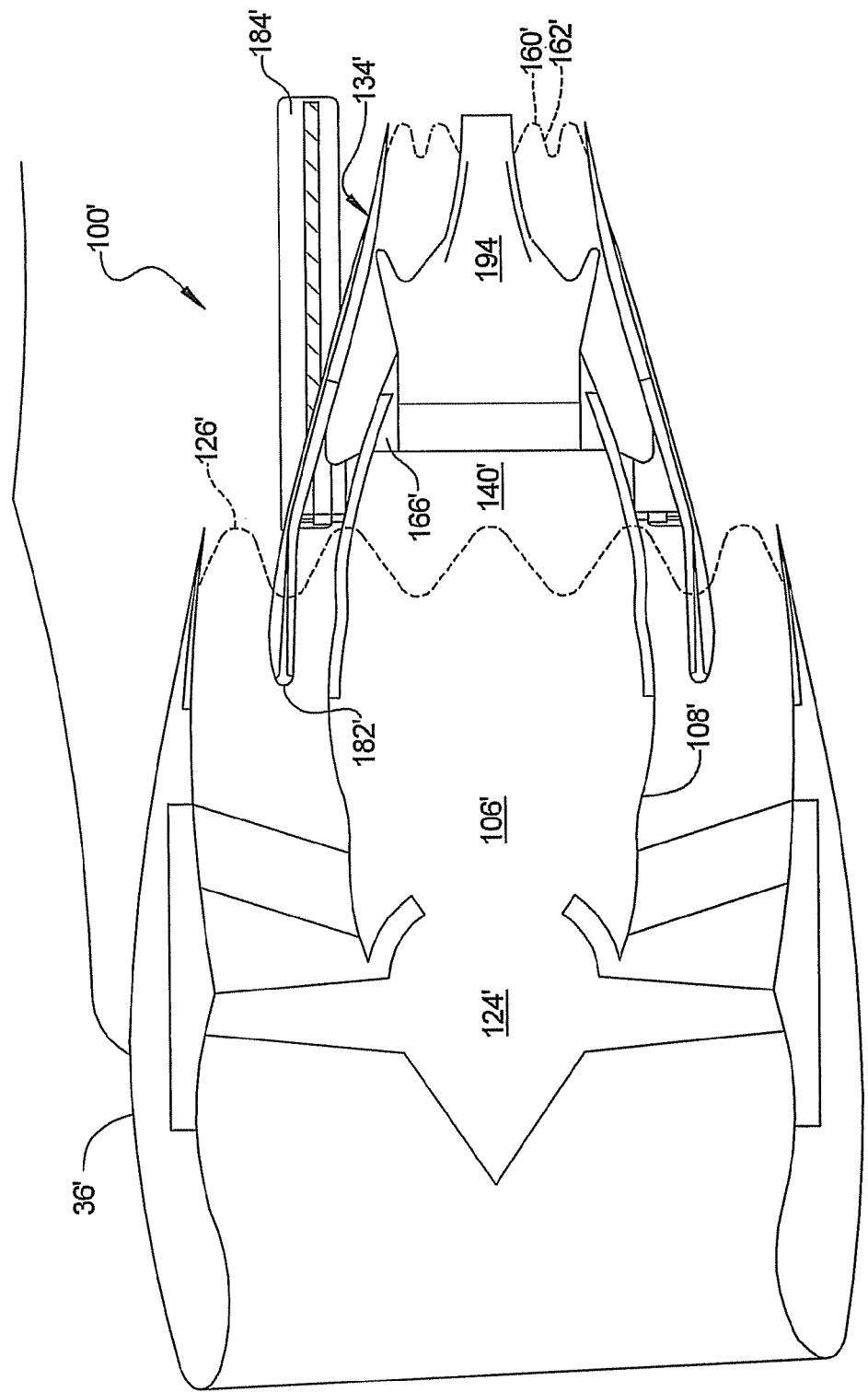
FIG. 8 is a simplified side view of one specific configuration of a turbofan engine in accordance with the present disclosure.

Referring to FIG. 8, one specific configuration of another turbofan engine assembly 100' in accordance with the present disclosure is shown. The various components shown in FIG. 8 that are common with those discussed in connection with FIG. 2A have been denoted with the same reference numbers as used in the discussion of the embodiment of FIG. 2A, but with the reference numbers used in FIG. 8 also including the prime designation (i.e., "'"). It will be appreciated that the components described in connection with FIG. 2A apply for the turbofan engine assembly 100' with the exception of a new construction for the mixer duct shell 134' and the incorporation of a new center body ventilation and mixer device 194, which will hereafter be referred to simply as the "mixer 194". The mixer duct shell 134' can be seen to be supported by a pillar slide 184' such that a leading edge 182' of the mixer duct shell 134' extends within an exit nozzle 126' of the short nacelle 102'. A downstream edge 162' of the mixer duct shell may include chevrons 160'.

With further reference to FIG. 8, instead of separate components that form the tail cone exhaust plug 110 and the lobed mixer 164, the turbofan engine assembly 100' incorporates the new mixer 194. The mixer 194 is disposed at a downstream side of a core engine 106' having a fan 124' and mounts to the aft portion 140' of a turbine case and the aft portion of a core exhaust shroud. The mixer 194 is substantially entirely surrounded by the mixer duct shell 134'. The mixer 194 and its function will be described in greater detail in the following paragraphs and in connection with FIGS. 13-20.

Referring now to FIG. 9, a highly enlarged cross sectional portion of an acoustic lining 137 that may be secured to an inside surface and/or an outside surface of the mixer duct shell 134' in shown. In this embodiment the acoustic lining 137 may incorporate a continuous, high temperature, composite honeycomb core structure, indicated by number 137a. General material compositions for the composite core can include light-weight ceramics, ceramic matrix composites (CMCs) or porous composites to save weight.

Figure 11:
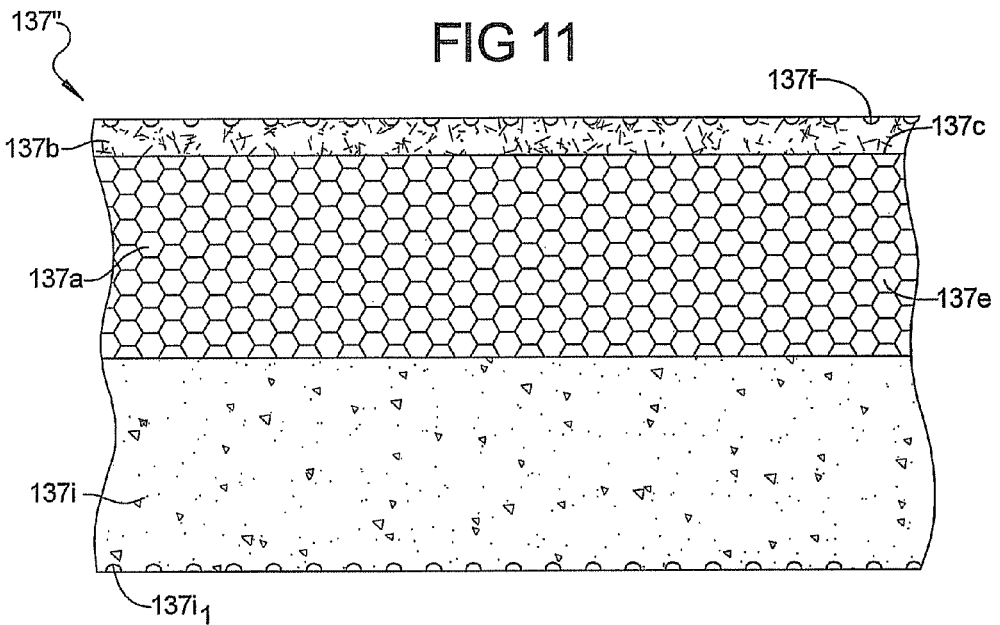
FIG. 11 is a highly enlarged, cross sectional side view of another form of acoustic lining that may be secured to one or both opposing surfaces of the mixer duct shell, where an outer surface of the acoustic lining includes a facesheet secured thereto and an inner surface forms a bulk absorber layer, with a honeycomb core sandwiched therebetween.
Figure 12:
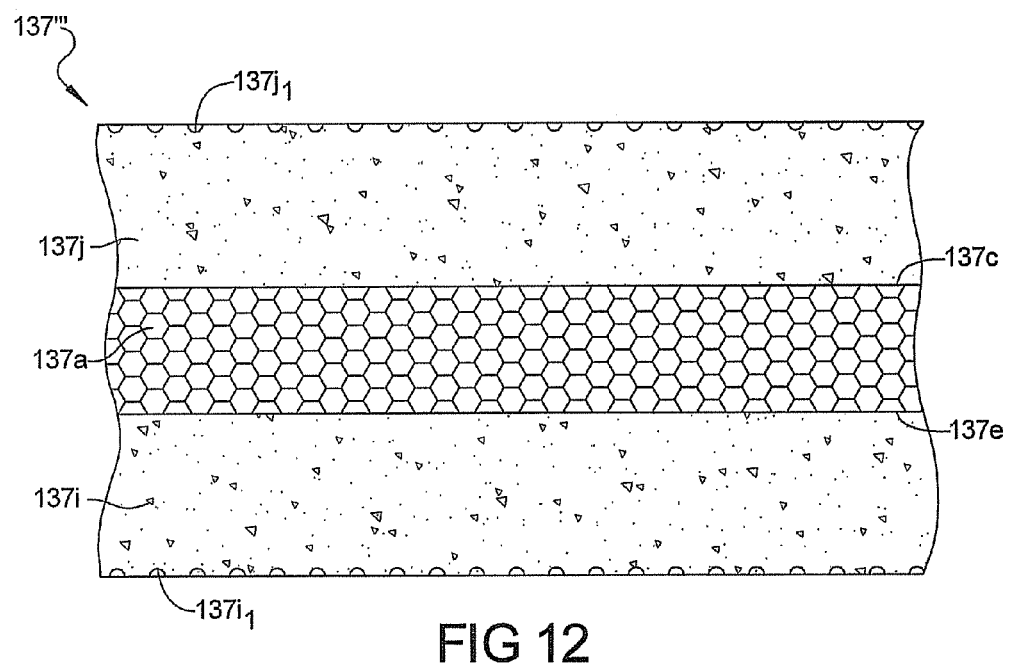
FIG. 12 is a highly enlarged, cross sectional side view of another form of acoustic lining that may be secured to one or both opposing surfaces of the mixer duct shell, where the acoustic lining is formed by a pair of layers of bulk absorber material separated by a honeycomb center section.

A first facesheet 137b may be secured, either by weld adhesives or other suitable means, to an exterior surface 137c of the honeycomb core 137a. Similarly, a second facesheet 137d may be secured by weld adhesives or other suitable means to the inner surface 137e of the honeycomb core 137a. Each of the first and second facesheets 137b and 137d may have a plurality of perforations or pores 137f and 137g formed therein. The facesheets 137b and 137d may each be made from high temperature materials including titanium and titanium alloys, Inconel, or CMC for the inner (high temperature) facesheet, and similar material choices or lighter metal alloy liners used in commercial engine fan ducts for the outer (lower temperature) facesheets. Temperature tolerance and cost dictate the optimized solution for each acoustic liner application. The facesheets 137b and 137d for the acoustic lining 137 may have a preferred thickness of substantially 0.004 inch (0.1 mm) in regions of active acoustic absorption. The thickness may vary in the presence of joints, attachment points, or other regions necessitating structural strength. The latter could for example be in a region of penetrations for systems housings, vents, or other attachments. However, it will be appreciated that this thickness may vary somewhat depending on the specific material that is used for the facesheets 137b,137d and the precise location on the mixer duct shell 134' that the facesheets 137b,137d are located at. The shape of the perforations may be circular or otherwise substantially symmetric in shape, and the diameter or characteristic dimension preference varies depending on whether the facesheet 137b or 137d covers the honeycomb core 137a or forms a bulk absorber facesheet layer. Bulk absorber facesheets 137i1 and 137j1 are shown in FIGS. 11 and 12. A preferred diameter for the perforations 137f,137g, when the facesheets 137b,137d are applied over the honeycomb core 137a, may vary substantially between about 0.016 inch and about 0.028 inch (0.4 mm-0.7 mm). A preferred diameter for the perforations 137i1,137j1 for the bulk absorber facesheets 137i,137j may vary substantially between about 0.02 inch to about 0.16 inch (0.5 mm-4 mm).

The percent open area, or porosity (both are acceptable terms of art) that the perforations 137f,137g form on the facesheets 137b,137d may vary substantially between about 5% and about 30%, and for a bulk absorber facesheet substantially between about 25% and about 50%. The depths of the perforations 134f and 134g are preferably tuned for the differing gas temperatures (i.e., speed of sound differences) on both sides of the mixer duct shell 134' and the differing spectral noise signatures on both sides of the mixer duct shell 134'. The depths of the perforations 137f and 137g may be the same or may differ. The thickness of the honeycomb core 137b may be on the order of about 0.4 inch-2.0 inches (10 mm-50 mm).

Typically, the depth of the honeycomb core 137a will vary slightly over the axial length of the mixer duct shell 137a, with the depth of the honeycomb core 137a at the downstream edge of the mixer duct shell 162' tapering down to a depth which is less than that at the remainder of the mixer duct shell 134'. It is an advantage that the first facesheet 137b and the second facesheet 137d may include different thicknesses, different sized perforations 137f and 137g, as well as different densities of the perforations 137f and 137g. The size and densities of the perforations 137f and 137g may thus be tailored to meet the needs (i.e., differing gas temperatures and spectral noise signatures) on opposing sides of the mixer duct shell 134' when the mixer duct shell 134' is used with a specific turbofan engine. Each turbofan engine will have slightly unique characteristics for which each of the parameters can be knowledgeably manipulated by someone skilled in this art of jet engine noise reduction.

Referring to FIG. 10, another embodiment of the mixer acoustic lining 137' is shown that includes the facesheets 137b and 137d, and in addition includes holes 137h formed through the honeycomb core 137a. The holes 137h extend completely through the honeycomb core 137a. The holes 137h may vary in diameter, but may be typically within a diameter range from the same as the smaller of the two opposing face sheet 137b,137d perforation diameters but not larger than the larger of the two opposing face sheet perforation diameters in diameter, and range in density within a range similar to that given above for the percentage open area for the facesheets 137b,137d. The holes 137h act to stimulate comparable sound attenuation to a double-layer acoustic lining, which may produce even more bandwidth covering. The embodiment of FIG. 10 is expected to be particularly useful for some engine cycles and center-body designs.

Referring now to FIG. 11, another embodiment of the mixer duct shell 137" is shown that incorporates a bulk absorber facesheet 137i on the inner surface 137e (i.e., the hot gas side of the mixer duct shell 134') rather than the facesheet 137d. The bulk absorber facesheet 137i is especially advantageous for applications where the structural depth of the downstream edge of the mixer duct shell 134' is too thin to easily incorporate the second facesheet 137d. The bulk absorber facesheet 137i may vary in thickness but is typically within about 0.4 inch-1.0 inch (10 mm-25 mm) thick, and is secured to the inner surface 137e of the honeycomb core 137a by weld adhesives or other suitable means. The bulk absorber facesheet 137i may include perforations 137i$_1$ having dimensions and densities described above for the perforations 137f and 137g. The bulk absorber material 137i may be preferred for use in applications where the structural depth of the honeycomb core 137a is limited and the hot stream (i.e., the stream on the inner surface 137e side) has more mixing noise than other sources in the acoustic signature.

Referring to FIG. 12, still another embodiment of the acoustic lining 137''' is shown. In this embodiment the acoustic lining 137''' includes two bulk absorber facesheets 137i and 137j, with the bulk absorber facesheet 137i including perforations 137i$_1$ and bulk absorber facesheet 137j including perforations 137j$_1$. Bulk absorber facesheet 137i is secured to the inner surface 137e of the honeycomb core 137a while facesheet 137j is secured to the outer surface 137c. Each of the bulk absorber facesheets 137i and 137j may have similar or differing thicknesses, but in most instances will be similar to the thicknesses given above for facesheet 137i. Alternatively, one or both of the layers 137i and 137j may be provided without perforations. The use of bulk absorber facesheets 137i and 137j on both sides of the honeycomb core 137a may be preferred when the structural depth of the honeycomb core is limited on both sides.

Figure 12A:
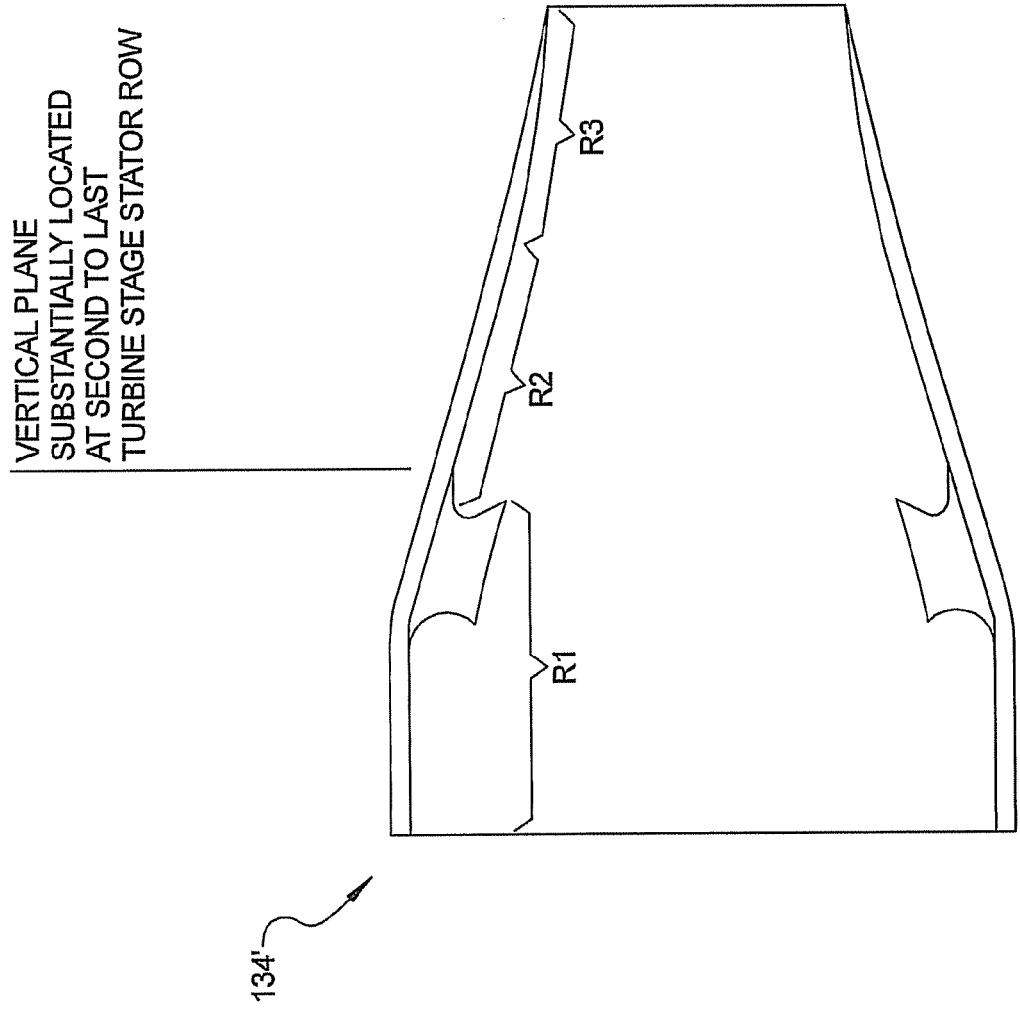
FIG. 12A is a simplified illustration showing how the acoustic lining may preferably be tuned to attenuate specific types of noise present in each of three distinct regions R1, R2 and R3 of a turbofan jet engine, with region R1 representing a region where fan noise is predominant, region R2 representing a region where low pressure turbine noise is predominant, and region R3 representing a region where mixing noise is predominant.
Figure 13B:
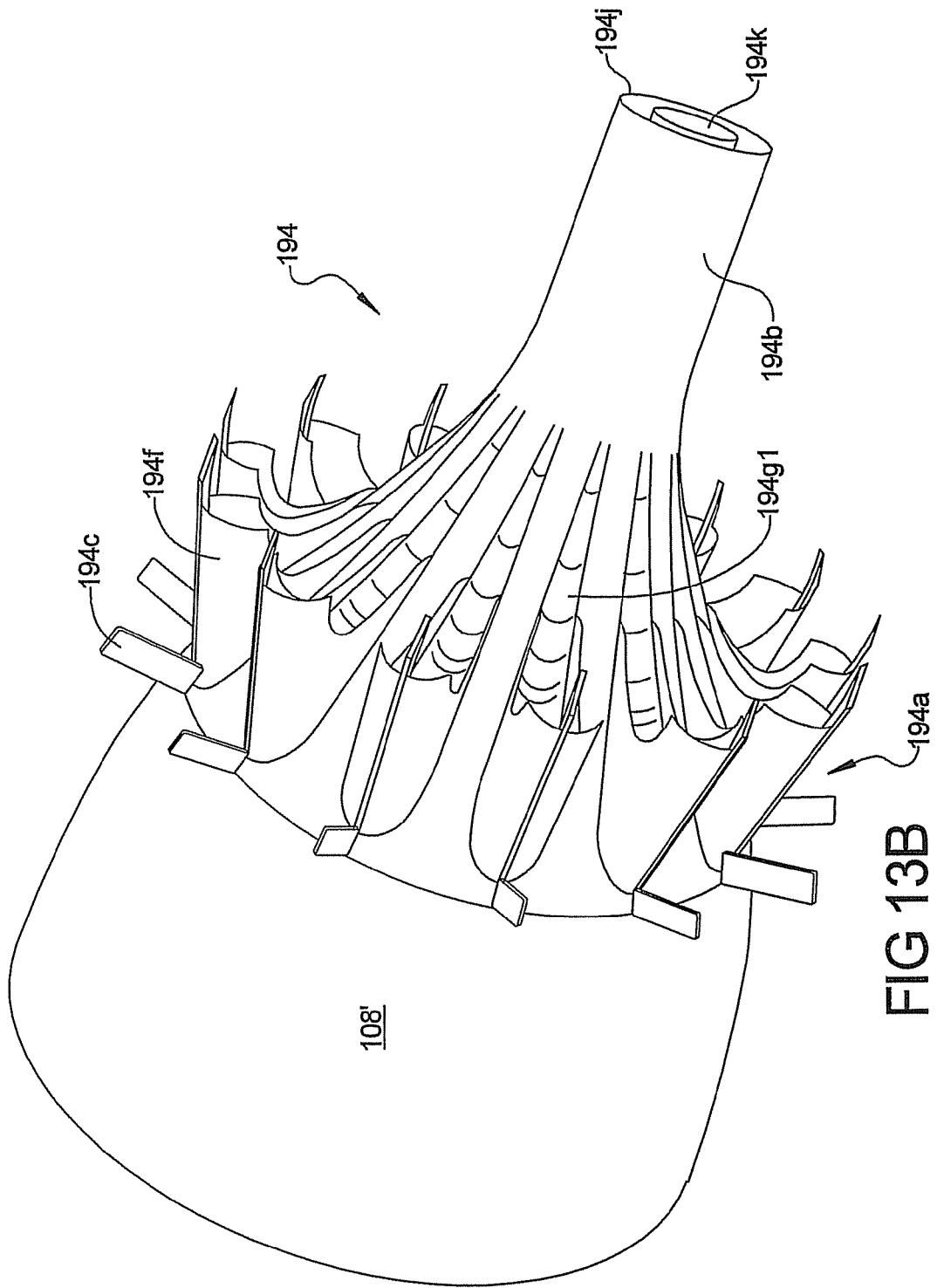
FIG. 13B is a perspective view of a portion of the mixer of FIG. 13 looking upstream from the aft end of the mixer.
Figure 17:
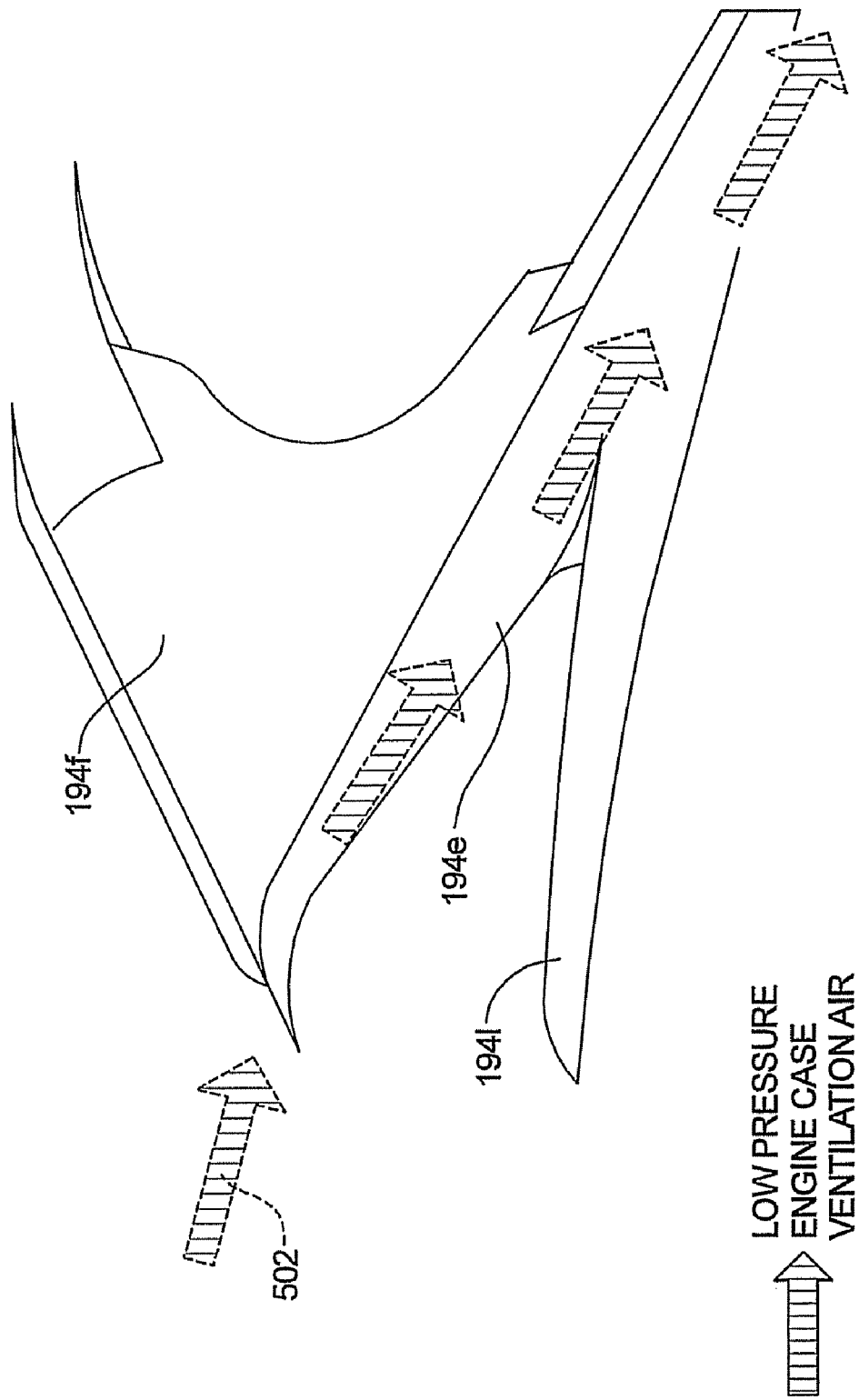
FIG. 17 is a partial cross sectional view of just one of the integral vent paths taken in accordance with section line 17-17 in FIG. 16.

With reference to FIG. 12A, it will also be appreciated that the mixer duct shell 134' may incorporate two or more different ones of the acoustic lining 137 constructions explained in connection with FIGS. 9-12 at different areas of the mixer duct shell 134'. It will be appreciated that for most High Bypass Ratio (HBR) turbofan engines, the acoustic field encountered by acoustic linings in the upstream region of the mixer duct shell 134' (region R1) is aft-radiated fan noise. A unique factor with the inner surface of the mixer duct shell 134' is that it will also be exposed to low pressure turbine noise which will exist in region R2. Accordingly, for at least the forward one-third of the mixer duct shell 134', the properties of the acoustic lining on both the outer and inner side of the mixer duct shell may be substantially the same, with exception of differences (if significant) between the local speed of sound. Due to heat soaking, the inner part of the forward mixer duct shell 134' likely encounters a slightly higher temperature and corresponding speed of sound. For the roughly the middle third of the inner mixer duct shell (region R2), the dominant tonal sound field is generally from the low pressure turbine. The last third (region R3) is dominated by jet mixing noise. Thus, the acoustic lining on the inner surface of the mixer duct shell 134' may be divided and tailored into substantially three acoustic treatment zones: 1) fan (region R1); 2) turbine (region R2) and 3) jet mixing noise (region R3). Conversely, the primary tuning priority of the acoustic lining on the outer surface of the mixer duct shell is fan tonal sources. It is also preferred that the acoustic lining in each region be manufactured as a continuous 360 degree barrel section.

Figure 18:
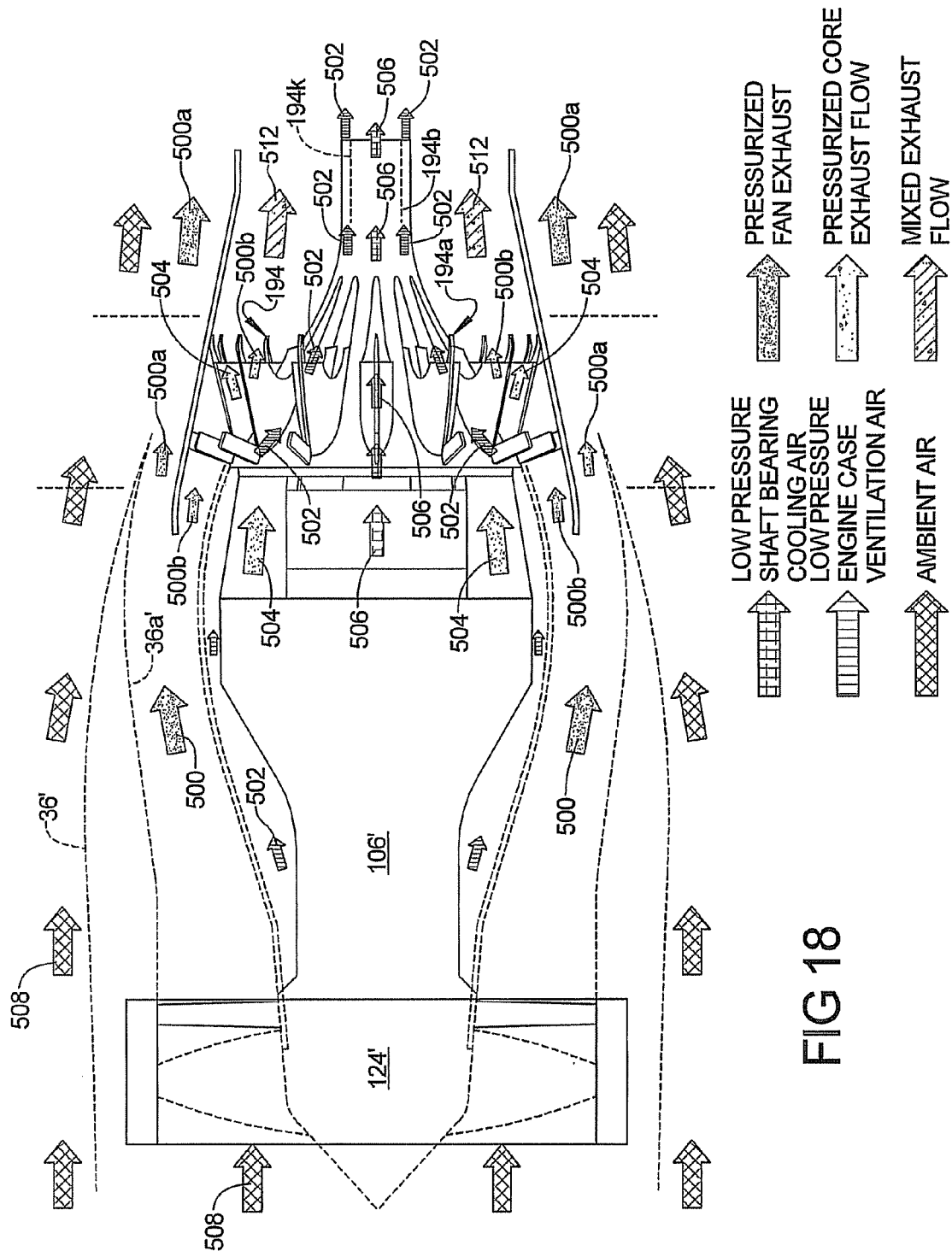
FIG. 18 is a side view of the mixer coupled to the aft end of the core engine turbine frame and core exhaust case and also illustrating the various flows and how they are mixed and routed by the mixer.

The primary role of the forward/upstream part of the acoustic lining 137 on the outer wall of the mixer duct shell 134' will be targeting the same sound source(s) that the acoustic lining on the fan duct inner wall 36a', as shown in FIG. 18. Because the annular fan "duct" terminates at completion of the fan-nozzle trailing edge (or Chevrons, if they are used) the acoustic lining 137 on the outer wall of the mixer duct shell 134' can either be unchanged relative to the rest to save costs. Alternatively, the acoustic lining 137 downstream of the fan nozzle exit on the outer surface of the mixer duct shell 134' can be altered to target broadband noise through use of the same bulk absorbing material used on the inner wall of the mixer duct shell 134', and the same face sheet used on the forward part of the outer shell, but with a relatively high level of porosity (25% to 40%).

With regards to acoustic lining on the inner surface of the mixer duct shell 134' the following motivations for different special lining arrangements are articulated. Because airflow produced by the fan 124' (FIGS. 8 and 18) is split into first and second flows; source noise energy comparable to that which propagates on the outer side of the mixer duct shell 134' propagates on the inner side as well. The modal content will differ due to the presence of the mixer duct shell 134'. However, the multi-segment acoustic lining design presented in the present disclosure is expected to compensate for all of the significant modes that contribute to far-field noise. The forward (upstream) most region of the acoustic lining 137 (i.e., Region 1) on the inner surface of the mixer duct shell 134' may thus be preferably designed for the same target tonal and broad-band frequencies as the inner surface of the outer fan duct for both cases where the mixer duct shell is original equipment or a retrofit. This "fan source" zone extends backward to substantially the plane coincident with the fan nozzle trailing edge. The Low Pressure Turbine (LPT) zone (Region 2) is characterized by slightly higher tonal frequency noise with a significant broad-band energy covering a large frequency range. For Region 3, the preferred cavity depth will be less and the perforate diameter smaller (proportionate to dominant sound frequency and the speed of sound by Helmholtz law—which is well known to those of skilled in the art), and the ranges for these parameters have been previously explained herein)) for the same face sheet thickness. This zone extends aft to the mixing plane. For the jet mixing zone (Region 3), most people skilled in the art are likely to presume that the desired jet noise frequency to attenuate is the typical "mixer lift" frequency observed in the far-field which can occur between 4,000 and 5,000 Hz. Tuning the acoustic liner 137 for 4 KHz to 5 KHz, however, will not likely result in effective far-field noise reduction however because this lift is typically the result of scattering. Accordingly, for the greatest overall reduction in far-field noise an optimum target frequency for the mixing noise is substantially about 2,000 Hz. To absorb this jet mixing source as well as other modes from upstream sources that are not entirely absorbed by the upstream acoustic liner sections 137, the honeycomb 137a cavities may be replaced with the CMC bulk lining material. The bulk lining material produces effective sound absorption about a highly broad range of frequencies about a central preferred target frequency of desire (i.e., about 2000 Hz).

It has been depicted that at least three unique zones (i.e., Regions 1-3) are preferably employed for the acoustic lining 137 on the inner surface of the mixer duct shell 134'. It is furthermore apparent that these zones are preferably segregated in some way. For efficient manufacturing it is preferred that the acoustic honeycomb linings 137 of the mixer duct shell be manufactured as complete elements as much as possible. The result is therefore typically cylindrical or conical honeycomb acoustic ling elements of substantially uniform properties. Once assembled/fastened onto the mixer duct shell 134' structure, it is then preferred that both inner and outer face-sheets, for example facesheets 137b and 137d, each be of a single piece construction, with thickness and perforations being specific to each zone. Any type of internal barrier between zones is not preferred except between honeycomb and bulk material, with exceptions being possible for containment of fluid isolation.

FIG. 12B is a graph of an exemplary in-duct "insertion loss" that may be provided by the various embodiments of the acoustic lining discussed above in connection with FIGS. 9-12. It will be appreciated that the term "insertion loss" is a term of art, and that for the specific acoustic lining configuration that is implemented, the frequency specific Insertion illustration in FIG. 12B may be preferred. Specifically, a desired insertion loss will comprise a unique narrow and broad double hump performance illustrated by humps 137K and 137L of the waveform shown in FIG. 12B. A moderate frequency hump (i.e., hump 137K) is tailored toward jet mixing noise. A broad high frequency hump (hump 137L) is actually the product of two adjacent discrete humps and is tailored toward the fan and low pressure turbine (LPT) zones respectively. A tolerance band 137m is shown in shading around a nominal curve 137n and represents acceptable unique optimization opportunities for different engine designs.

With reference to FIG. 12C, it will be seen that upper and lower, radially inwardly extending bifurcations B1 and B2 are used to support the short nacelle 36'. FIG. 12D illustrates the upper bifurcation B1, and it can be seen that the upper bifurcation makes use of a semi-bulbuous, aerodynamically shaped fairing F1 where the upper bifurcation B1 meets the mixer duct shell 134'. FIG. 12E illustrates that another semi-bulbuous fairing F2, identical to fairing F1, is also used on the opposite surface of the mixer duct shell 134'. It will be appreciated that the lower bifurcation B2 similarly includes a pair of fairings F1 and F2 where it intersects the mixer duct shell 134'.

Referring now to FIGS. 12F-12I, it can be seen how a carry through component 135 may be used to extend through one or more of the acoustic lining 137. The carry through component 135 may be a solid or possibly even tubular structural component, preferably made from metal, that may be used for securing the acoustic lining(s) 137 on one or both sides of the mixer duct shell 134'. Referring specifically to FIG. 12F, the carry through component 135 may include an elongated element 135$a$ with a receptacle 135$b$ and 135$c$ at its opposite ends. The receptacles 135$b$ and 135$c$ form attachment elements that may be welded or bonded to the facesheets 134$b$ and 13$d$, depending on the precise construction of the facesheets. FIG. 12G illustrates the carry through component 135 secured to one surface of the mixer duct shell 134'. FIG. 12H illustrates the carry through component 135 with its receptacles 135$b$ and 135$c$ secured to a rivet component 135$d$ sitting in a countersunk opening in a surface of the mixer duct shell 134'. FIG. 12I illustrates that when a carry through component 135 is used to extend through the honeycomb, preferably it will extend through a point of intersection of a plurality of the cells of the honeycomb layer 137$a$. The intersecting corners of a plurality of cells will be machined out or otherwise removed to form an elongated hole through the honeycomb 137$a$ that the elongated element 135$a$ of the carry through component 135 may extend.

Referring now to FIGS. 13-17, the structure of the mixer 194 will be described in greater detail. The mixer 194 forms a circumferential component having a circumferential forward body portion 194$a$, attached in part to an aft portion a engine turbine case 141' and also to an aft portion of a core exhaust shroud 141$a$', as shown in FIG. 14. The mixer 194 forward body portion 194$a$ narrows into a center body tube 194$b$, within which a second, smaller diameter co-annular tube 194$k$ is located. A plurality of radially extending support vanes 194$c$ extend about the periphery of the forward body portion 194$a$ and are attached to the aft engine turbine frame 166' (FIG. 8), and form an outer mixer flow path 194$d$ (FIG. 15), as well as form points of attachment from which the mixer duct shell 134' can be supported radially offset from the mixer 194. A plurality of circumferentially spaced annular cavity vent paths 194$e$ (FIGS. 13, 14 and 17) are integrally formed in the forward body portion 194$a$, circumferentially about the forward body portion 194$a$, and extend into communication with the center body tube 194$b$ through ports 194$e$1 (FIG. 13$c$). This plurality of cavity vent paths 194$e$ conducts engine case ventilation flow emanating from a gap between the core engine case and the interior surface of the inner fan case shroud in a radially inward direction flowing into a co-annular flow path 194$b$1 (FIG. 13) between the inner surface of the center body tube 194$b$ and the outer surface of the co-annular concentric tube 194$k$. A plurality of scalloped projecting portions 194$f$ (FIGS. 13 and 14) are formed circumferentially about the forward body portion 194$a$ and help to form a plurality of inner mixer flow paths 194$g$, as best illustrated in FIGS. 15 and 16. A mixer trough 194$g$1 extends downstream of each inner mixer flow path 194$g$, as seen particularly well in FIGS. 13$b$ and 14. The inner mixer flow paths 194$g$ will be referred to collectively hereinafter simply as the "inner mixer flow path 194$g$". A circumferential wall portion 194$h$ couples to the aft portion of the core engine turbine case 141' in FIG. 14, while wall portion 194$a$1 is secured to the core exhaust shroud 141$a$'. An axially disposed vent exit 194$j$ is formed at an aft end of the center body tube 194$b$. Within the vent exit 194$j$ is the concentric inner tube 194$k$.

With reference to FIG. 14, the outer mixer flow path 194$d$ is used for receiving a pressurized fan exhaust flow 500, which typically has a temperature around 100 degrees Fahrenheit. The annular cavity vent paths 194$e$ (FIG. 17) receive a low pressure flow of engine case ventilation air 502, which typically has a temperature around 600 degrees Fahrenheit. A pressurized core exhaust flow 504, typically on the order of around 1200 degrees Fahrenheit, flows into the inner mixer flow path 194$g$. Low pressure engine shaft bearing cooling air 506, typically on the order of around 500 degrees Fahrenheit, flows into an inner area 194$i$ defined by an interior surface of wall portion 194$h$.

Referring now to FIG. 18, the directions and mixing of the various flows will be described in further detail. Ambient air 508 flows around the outer perimeter of the short nacelle 36'. Ambient air 508 also enters within an interior area of the short nacelle 36' and is drawn into the engine 106' by fan 124'. The ambient air 508 is heated as it flows over an outer perimeter of a core exhaust engine shroud 108' (FIG. 13B) and becomes the pressurized fan exhaust flow 500 as it moves toward the aft end of the engine 106'. A first portion 500$a$ of the pressurized fan exhaust flow 500 is routed through an annular opening formed between an outer surface of the mixer shell 134' and an inner surface of the aft end of the short nacelle 36'. A second portion 500$b$ of the pressurized fan exhaust flow 500 flows into the outer mixer flow path 194$d$ formed between adjacent ones of the radially extending fins 194$c$. The low pressure shaft bearing cooling flow 506 flows out of engine 106', into the interior area defined by wall portion 194$h$, and is channeled through the interior area of the concentric tube 194$k$. Engine case ventilation flow 502 is channeled through the integral vent mixer tubes 194$e$, through ports 194$e$1, and radially inwardly into the annular cavity 194$b$1 formed between the interior surface of the center body tube 194$b$ and the outer surface of the concentric tube 194$k$. The flows 506 and 502 exit separately through the center concentric tube 194$k$ and the annular cavity 194$b$1. Both flows have temperatures typically between about 500-600 degrees Fahrenheit, and slightly different pressures that demand separate exits to prevent one from back pressuring the other. For some engines the pressures of the two vent flows can be substantially the same allowing the concentric inner tube 194$k$ flow to be mixed within the interior cavity of the center body tube 194$b$. In that instance, a mixed flow, combined from the two flows 506 and 502, would exit the vent exit 194$j$ of the center body tube 194$b$.

The mixer 194 overcomes deficiencies of previously used mixing approaches by adding efficient means of conducting the low pressure case vent air through the above defined flow path out the center line of the pressurized higher-velocity mixed exhaust flow. This overcomes the problem of trapping engine case heat or providing a substantial efficiency loss to, in effect, pump that flow out of the engine 106' through other pneumatic or forced transport means. Mixer 194 provides the benefit of a simple and efficient transport of the vent cooling air, to keep the engine 106' cool during all phases of operation where flow is exhausting from the mixer 194.

Another important benefit is the significant thermal cooling on the mixer 194 itself that is provided by the integral annular cavity vent paths 194$e$. The vent paths 194$e$ significantly reduce the temperature exposure on the leading edge surface 194L (FIG. 17) of the mixer 194 that is protruding into the hot pressurized core exhaust flow 504. This results in significantly improved cooling of the mixer device 194, and especially at the leading edge 194L. This can also significantly reduce the thermal fatigue on the mixer 194 as compared to other conventional mixer devices. The significantly improved cooling of the mixer 194 may also allow a reduction in mixer 194 weight through the use of thinner gauge materials, while still allowing the materials to meet the anticipated thermal stresses that the mixer 194 will experience during operation of the jet engine 106'.

With further reference to FIG. 18, the extremely hot pressurized core exhaust flow 504 flows into the inner mixer flow path 194g and mixes with the second flow portion 500b of the much cooler pressurized fan exhaust flow 500b, which is flowing radially inwardly between the scalloped projecting portions 194f toward the center body tube 194b. This mixing occurs through the turbulent interleaving of two pressurized concentric flows (inner hot and outer cool) by a plurality of peaks and troughs that disperse the hot and cold flows into interleaved (alternating hot and cool) areas confined by the peaks of the mixer lobes 194f and recessed troughs 194g1. This significantly cools the incoming pressurized core exhaust flow 504 to create a flow 512 that exits the mixer 194 at a temperature typically around 600 to 700 degrees Fahrenheit, or close to that of the engine case ventilation flow 502. This has the benefit of significantly reducing the heat "signature" of the engine 106', and may contribute to making the exhaust plume of the engine 106' less susceptible to heat detection in military aircraft applications.

Figure 19:
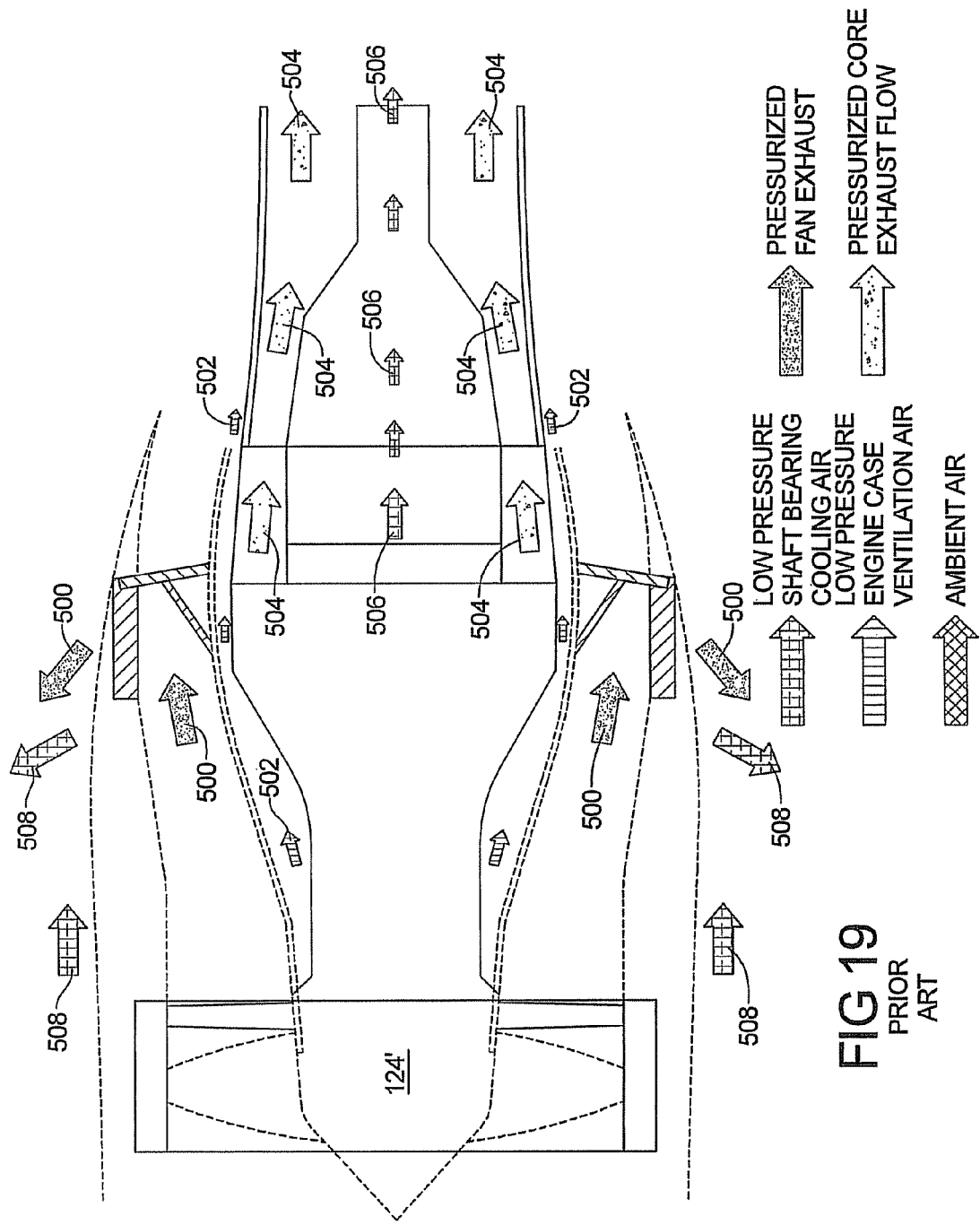
FIG. 19 is a prior art simplified side cross sectional view of a thrust reverser in operation on a conventional turbofan jet engine and the typical flows that exist during this phase of operation of the engine.
Figure 20:
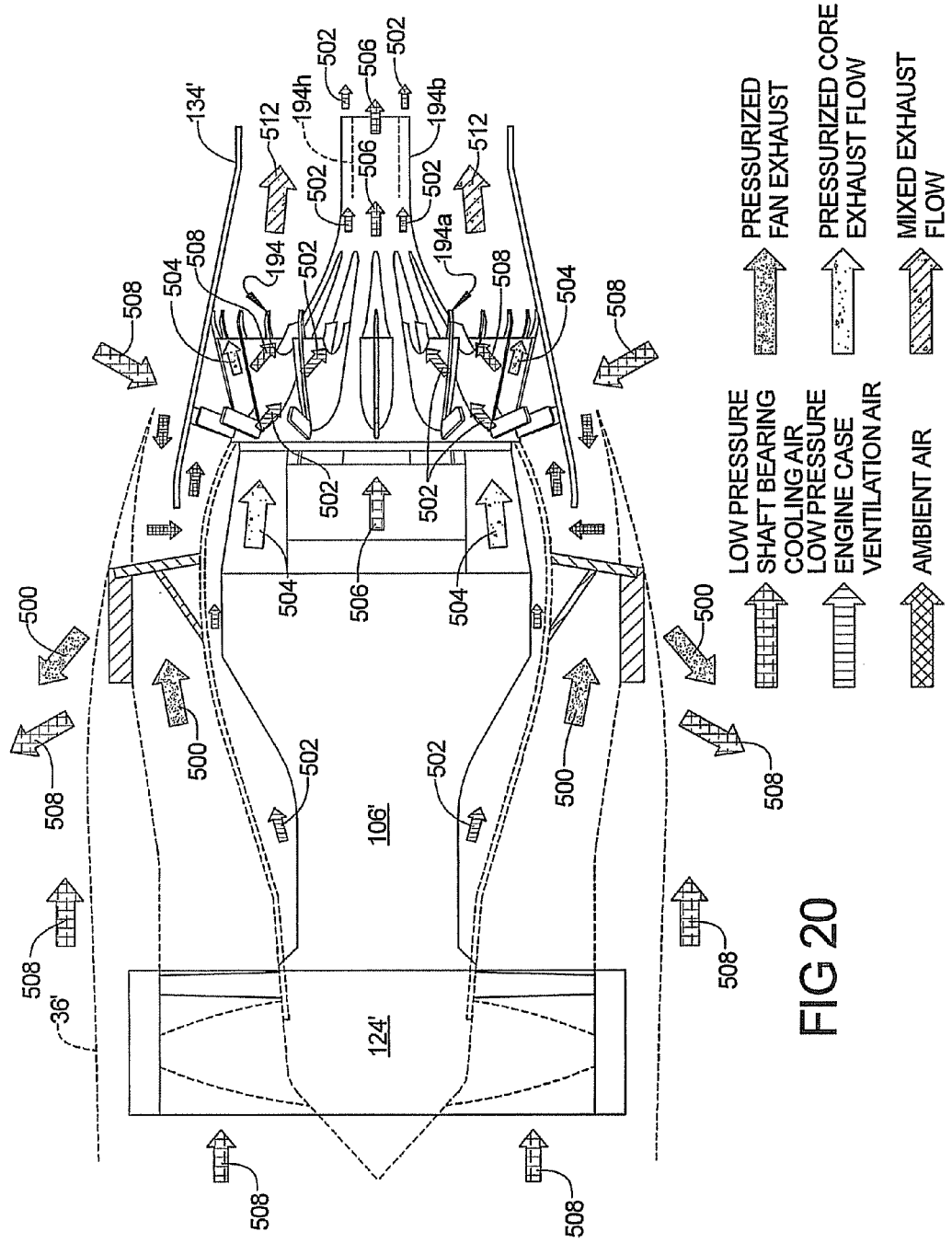
FIG. 20 is a simplified side cross sectional view of the turbo fan jet engine of the present disclosure illustrating the various flows when thrust reverser operation is occurring.

Referring now to FIGS. 19 and 20 the difference in how the mixer 194 influences thrust reverser operation can be seen. FIG. 19 is an illustration of a prior art thrust reverser being used on a turbofan jet engine with the mixer 194 and the mixer duct shell 134' of the present disclosure. Engine case air does not pump during thrust reverser operation. With reference to FIG. 20, however, with the mixer 194 and the mixer duct shell 134', the engine case ventilation air 502 still pumps during thrust reverser operation. During this operation an ambient air flow 508 is drawn in through the engine fan exhaust exit, reversedly, and around the gap between the mixer duct shell 134' leading edge and the back of the deployed thrust reverser gate. The flow 508 then flows into the mixer 194 and passes through the mixer 194, thus mixing with the diffusing core flow leaving the scalloped mixer lobes 194f. The flow diffusion is tempered by the siphoning action of the reverse ambient air flow through the mixer duct resulting in the pumping of the mixture of the flows and the cooling of temperature and slowing of velocity of the mixture. The much slower velocity, lower temperature diffused exhaust flow, represented by arrows 512, subtracts substantially less from the reverse thrust generated by the fan duct flow 500, thus making thrust reverser performance even better than that from the common class of prior art engines operating fan exhaust thrust reversers.

Various implementations of the disclosure can provide comprehensive reduction in both noise and heat radiation over an entire takeoff and approach operational envelope by virtue of a partial amount of bypass internally ducted and efficiently mixed with high-velocity hot core exhaust. This greatly reduces community noise for commercial aircraft and infrared threat susceptibility for military aircraft. Various implementations also can provide reduction in plume energy sufficient to eliminate or reduce potential on-board sensor visibility interference for countermeasures systems, when looking directions through own aircraft generated plumes, thereby increasing protection against, e.g., to man-portable air defense (MANPAD) systems.

An additional benefit is that various implementations also can enable high aerodynamic performance and greater cruise range flexibility at altitudes away from populations and threats, where the feature of internal mixing enhances fuel economy. At lower altitudes, implementations in accordance with principles of the disclosure can offer an ability to maximize thrust performance (allowing increasing fuel capacity or payload lift at takeoff), while keeping noise and heat emissions from the engine plumes well controlled. Modest changes can be made to outermost short-nacelle surfaces in accordance with principles of the disclosure while retaining high aerodynamic efficiency, low drag, and excellent propulsive performance.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An integrated, single piece mixer-center body ventilation apparatus for use with a turbofan jet engine, the apparatus comprising:
    a circumferential forward body portion adapted to be coupled to an aft end of a core engine turbine case of the jet engine;
    a center body tube portion integrally formed with the circumferential forward body portion and having an axially opening vent exit at an end of the center body tube portion; and
    the circumferential forward body portion further including a plurality of inner mixer flow paths in communication with scalloped projecting portions for directing a pressurized core exhaust flow through the integrated, single piece mixer-center body ventilation apparatus and mixing the pressurized core exhaust flow with a portion of a pressurized fan exhaust flow, to thus significantly cool the pressurized core exhaust flow;
    a concentric tube disposed within the center body tube portion to form an annular flow path between an outer surface of the concentric tube portion and an inner surface of the center body tube portion, the annular flow path terminating at a downstream edge of the center body tube portion; and
    a plurality of integrally formed vent flow paths that extend through the circumferential forward body portion into communication with the annular flow path, for receiving and channeling an engine case ventilation air flow flowing within a core engine shroud of the turbofan jet engine, into the annular flow path.

2. The apparatus of claim 1, wherein the integrally formed vent flow paths are arranged circumferentially around the circumferential forward body portion and extend radially inwardly toward an axial center of the center body tube portion, and into communication with the annular flow path.

3. The apparatus of claim 2, wherein a shaft bearing cooling airflow exiting the jet engine is directed into an interior area of the concentric tube.

4. The apparatus of claim 1, wherein a shaft bearing cooling airflow exits the jet engine and is directed into an interior area of the concentric tube to maintain the shaft bearing cooling airflow separate from the engine case ventilation air flow.

5. The apparatus of claim 4, further comprising a plurality of vanes projecting from the circumferential forward body portion for securing the integrated, single piece mixer-center body ventilation apparatus within a supporting structure associated with the turbofan jet engine, and wherein the plurality of vanes help to form an outer mixer flow path for channeling the engine case ventilation air flow radially inwardly toward the center tube of the integrated, single piece mixer-center body ventilation apparatus.

6. The apparatus of claim 5, wherein the plurality of vanes are arranged to extend radially outwardly from the circumferential forward body portion, and are further arranged circumferentially around the circumferential forward body portion.

7. The apparatus of claim 1, wherein an additional portion of the pressurized fan exhaust flow is channeled away from the integrated, single piece mixer-center body ventilation apparatus.

8. A turbofan jet engine comprising:
   a core engine; an engine case for enclosing the core engine;
   a core engine shroud for enclosing the engine case and defining a flow area there between;
   a single piece mixer-center body ventilation component for mixing a portion of a pressurized fan exhaust flow flowing adjacent the core engine shroud with a pressurized core exhaust flow exiting the core engine;
   wherein the single piece mixer-center body ventilation component includes:
   a center body tube having an axially opening vent exit at an end, integrally formed with the single piece mixer-center body;
   a circumferential forward body portion adapted to be coupled to an aft end of a turbine case of the core engine;
   the forward body portion further including a plurality of scalloped projecting portions that help to collectively form an inner mixer flow path for channeling a pressurized core exhaust flow into contact with at least a portion of a fan exhaust flow to cause mixing there between, the mixing working to cool the core exhaust flow as the core exhaust flow exits the single piece mixer-center body ventilation component; and
   a plurality of circumferentially arranged, integrally formed vent air paths for channeling engine case ventilation air flowing within the core engine shroud of the turbofan jet engine, into the center body tube.

9. The turbofan jet engine of claim 8, further comprising a mixer duct shell disposed over the single piece mixer-center body ventilation component for defining mixer duct area concentric with the single piece mixer-center body ventilation component, for mixing the pressurized core exhaust flow and the pressurized fan exhaust flow core.

10. The turbofan jet engine of claim 8, wherein a shaft bearing cooling air flow is directed axially through the circumferential forward body portion and into a concentric tube that disposed within the center body tube, and thereafter exits at an opening vent exit port of the concentric tube.

11. The turbofan jet engine of claim 10, wherein a circumferential outer mixer flow path is formed in part by a plurality of vanes that extend radially outwardly from the circumferential forward body portion, the circumferential outer mixer flow path assisting in directing the portion of the fan exhaust flow into contact with the pressurized core exhaust flow.

12. A turbofan jet engine comprising: a core engine; an engine case for enclosing the core engine;
   a core engine shroud for enclosing the engine case and defining a flow area there between; and
   a single piece mixer-center body ventilation component for mixing a portion of a pressurized fan exhaust flow flowing adjacent the core engine shroud with a pressurized core exhaust flow exiting the core engine;
   wherein the single piece mixer-center body ventilation component includes:
   a center body tube having an axially opening vent exit at an end, integrally formed with the single piece mixer-center body;
   a circumferential forward body portion adapted to be coupled to an aft end of a turbine case of the core engine;
   the forward body portion further including a plurality of scalloped projecting portions that help to collectively form an inner mixer flow path for channeling a pressurized core exhaust flow into contact with at least a portion of a fan exhaust flow to cause mixing there between, the mixing working to cool the core exhaust flow as the core exhaust flow exits the single piece mixer-center body ventilation component;
   a concentric tube disposed within the center body tube to define an annular flow path between an outer surface of the concentric tube and an inner surface of the center body tube; and
   a plurality of circumferentially arranged, integrally formed vent air paths in the circumferential forward body portion for channeling engine case ventilation air flowing within the core engine shroud of the turbofan jet engine into the annular flow path within the center body tube, and outwardly through the vent exit port.

* * * * *